US011785227B2

(12) United States Patent
Ahn et al.

(10) Patent No.: US 11,785,227 B2
(45) Date of Patent: *Oct. 10, 2023

(54) VIDEO CODING METHOD AND DEVICE WHICH USE SUB-BLOCK UNIT INTRA PREDICTION

(71) Applicant: Intellectual Discovery Co., Ltd., Seoul (KR)

(72) Inventors: Yong Jo Ahn, Seoul (KR); Ho Chan Ryu, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,727

(22) Filed: Jan. 7, 2022

(65) Prior Publication Data

US 2022/0132141 A1    Apr. 28, 2022

Related U.S. Application Data

(63) Continuation of application No. 16/957,933, filed as application No. PCT/KR2018/016823 on Dec. 28, 2018, now Pat. No. 11,259,030.

(30) Foreign Application Priority Data

Dec. 29, 2017    (KR) .................. 10-2017-0183880

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/119* (2014.11); *H04N 19/176* (2014.11); *H04N 19/593* (2014.11); *H04N 19/70* (2014.11)

(58) Field of Classification Search
None
See application file for complete search history.

(56) References Cited

U.S. PATENT DOCUMENTS 9,930,365 B2    3/2018    Chen et al.
10,033,997 B2    7/2018    Hayashi et al.
(Continued)

FOREIGN PATENT DOCUMENTS

JP    2017-028337 A    2/2017
KR    10-2015-0004484 A    1/2015
(Continued)

OTHER PUBLICATIONS

Machine Translation of KR-10-2017-0111473 (Year: 2017).
(Continued)

*Primary Examiner* — Dave Czekaj
*Assistant Examiner* — Shanika M Brumfield
(74) *Attorney, Agent, or Firm* — Sughrue Mion, PLLC

(57) ABSTRACT

The present invention relates to an intra prediction scheme among video coding techniques and, more particularly, relates to a video decoding method and apparatus for diving a block into a plurality of sub-blocks when intra prediction is performed and sequentially performing infra prediction on each of the sub-blocks. The decoding method performed by a video decoding apparatus includes determining whether to perform sub-block-based intra prediction on a current coding unit, dividing the current coding unit into a plurality of sub-blocks, performing intra prediction on each of the sub-blocks when a result of determination of whether to perform sub-block-based intra prediction has a value of "true", and directly performing block-based intra prediction on the current coding unit without dividing the current coding unit when the result of the determination has a value of "false".

11 Claims, 22 Drawing Sheets

(51) Int. Cl.
  *H04N 19/176* (2014.01)
  *H04N 19/593* (2014.01)
  *H04N 19/70* (2014.01)

(56) References Cited

U.S. PATENT DOCUMENTS

| | | |
|---|---|---|
| 10,154,261 B2 | 12/2018 | Wennersten et al. |
| 10,368,068 B2 | 7/2019 | Wennersten et al. |
| 10,645,399 B2 | 5/2020 | Jeon et al. |
| 2007/0002945 A1 | 1/2007 | Kim |
| 2013/0089149 A1 | 4/2013 | Hayashi et al. |
| 2016/0182904 A1* | 6/2016 | Watanabe ............ H04N 19/436 375/240.12 |
| 2016/0234495 A1 | 8/2016 | Wennersten et al. |
| 2016/0269730 A1 | 9/2016 | Jeon et al. |
| 2016/0301930 A1 | 10/2016 | Wennersten et al. |
| 2017/0374369 A1 | 12/2017 | Chuang et al. |
| 2018/0199072 A1 | 7/2018 | Li et al. |

FOREIGN PATENT DOCUMENTS

| | | |
|---|---|---|
| KR | 10-2017-0058908 A | 5/2017 |
| KR | 10-2017-0111473 A | 10/2017 |
| KR | 10-2445899 B1 | 9/2022 |

OTHER PUBLICATIONS

Machine Translation of KR-10-2015-0004484 (Year: 2015).
International Search Report dated Apr. 16, 2019 in corresponding International Patent Application No. PCT/KR2018/016823 (2 pages in English, 2 pages in Korean).
Office Action dated May 26, 2023 in Korean Application No. 10-2022-0117315.

\* cited by examiner

VIDEO CODING METHOD AND DEVICE WHICH USE SUB-BLOCK UNIT INTRA PREDICTION

CROSS REFERENCE TO RELATED APPLICATIONS

This application is a continuation of U.S. application Ser. No. 16/957,933 filed Jun. 25, 2020, which is a U.S. National Stage Application of International Application No. PCT/KR2018/016823, filed on Dec. 28, 2018, which claims the benefit under 35 USC 119(a) and 365(b) of Korean Patent Application No. 10-2017-0183880, filed on Dec. 29, 2017, in the Korean Intellectual Property Office, the entire disclosure of which is incorporated herein by reference for all purposes.

TECHNICAL FIELD

The present invention relates to an image processing scheme and, more particularly, to a video compression technology using sub-block-based intra prediction.

BACKGROUND ART

Recently, as the demand for high-resolution and high-definition video increases, a high-efficiency video compression technology for next-generation video services is required. To meet this need, ISO/IEC MPEG and ITU-T VCEG, which had jointly standardized H.264/AVC and HEVC video compression standards, organized a joint video exploration team (JVET) in October 2015. The JVET has been conducting research and exploration to establish a new video compression standard since then.

In video compression technology, a block partition structure refers to the basic unit for image coding and decoding and also refers to the basic unit for principle coding and decoding techniques such as prediction and transform. As the video compression technology advances, the unit size of blocks used for coding and decoding have increased, and more various types of block partition structures have been used for coding and decoding. While blocks are used as units of coding and decoding, finer units than blocks are also used for video compression depending on functions of blocks.

In the HEVC standard, video coding and decoding allow sub-block-based processing as well as block-based processing, depending on a quadtree block partition structure of a coding unit and on whether a coding unit is used for coding/decoding, prediction, or transform. In addition to the quadtree block partition structure, various block partition structures (for example, a quad tree plus binary tree (QTBT), which is a combination of a quadtree and a binary tree, and a multi-type tree (MTT), which is a combination of QTBT and a triple tree) have been proposed to improve video coding efficiency. Since various block sizes and various block partition structures are supported, and various coding unit-based information such as coding mode, motion information, and intra prediction direction information for each block within a picture are used, the number of bits used to express the information is greatly increasing.

Intra prediction scheme of video compression technology is a technique of performing prediction on a current block to be coded or decoded using pixels spatially adjacent to the current block. The intra prediction includes generation of prediction pixels using pixels spatially adjacent to a current block in various prediction directions and determination of an optimum intra prediction mode. Research on technology for increasing directionality of intra prediction modes or generating prediction mode candidates from which an optimum intra prediction mode is selected has been being conducted to improve coding efficiency of intra prediction. Specifically, regarding intra prediction performed in a video coding method and apparatus using various block partitioning structures, research on techniques for performing intra prediction in different modes depending on block partitioning methods and block sizes is being conducted.

DISCLOSURE

Technical Problem

An objective of the present invention is to provide a video coding method and apparatus. When performing intra prediction on a target block to be coded or decoded, in a case where the target block is large or has a rectangular shape, spatial similarity between pixels is likely to occur during some modes of intra prediction. The method and apparatus can solve this problem and improves coding efficiency.

However, technical problems to be solved by the present embodiment are not limited to the one as described above, and other technical problems can be solved by the present invention.

Technical Solution

In order to accomplish the objective, according to one aspect of the present invention, a video coding method and apparatus include: determining whether to perform sub-block-based intra prediction on a current coding unit; performing sub-block-based intra prediction on the current coding unit when a result of the determining is a value of "true"; and performing block-based intra prediction on the current coding unit when the result of the determining is a value of "false".

In order to accomplish the objective, according to one aspect of the present invention, a video coding method and apparatus include: comparing a size of a current coding unit and a size of a smallest coding unit for which sub-block-based intra prediction is allowed; and setting a value of a flag indicating whether to perform sub-block-based intra prediction to "true" or "false" depending on a result of the comparison between the size of the current coding unit and the size of the smallest coding unit for which sub-block-based intra prediction is allowed.

In order to accomplish the objective, according to one aspect of the present invention, a video coding method and apparatus include: determining whether a sub-block-based intra prediction is allowed for a current sequence, a current picture, or a current slice; comparing a size of a current coding unit and a size of a smallest coding unit for which the sub-block-based intra prediction is allowed; and setting a value of a flag indicating whether to perform sub-block-based intra prediction to "true" or "false" depending on a result of the comparison between the size of the current coding unit and the size of the smallest coding unit.

In order to accomplish the objective, according to one aspect of the present invention, a video coding method and apparatus include: dividing one coding unit into a plurality of sub-blocks; performing intra prediction on each of the sub-blocks of the current coding unit; and iterating the dividing of one coding unit and the performing of the intra prediction with respect to each of the sub-blocks of the current coding unit.

In order to accomplish the objective, according to one aspect of the present invention, a video coding method and apparatus include: determining a smaller size among a width and a height of a current coding unit; setting a width of a sub-block to the smaller size among the width and the height of the current coding unit; setting a height of the sub-block to the smaller size among the width and the height of the current coding unit; and dividing a current coding block into a plurality of sub-blocks using input data including the width and height of the current coding unit and the width and height of the sub-block.

In order to accomplish the objective, according to one aspect of the present invention, a video coding method and apparatus include: determining a larger size among a width and a height of a current coding; setting a width of a sub-block to a value obtained by dividing the width of the current coding unit by N and setting a height of the sub-block to the height of the current coding unit when the larger size is the width of the current coding unit; setting the width of the sub-block to the current coding unit and setting the height of the sub-block to a value obtained by dividing the height of the current coding unit by N when the larger size of the height of the current coding unit; and dividing a current coding block into a plurality of sub-blocks using input data including the width and height of the current coding unit and the width and the height of the sub-block.

In order to accomplish the objective, according to one aspect of the present invention, a video coding method and apparatus include: determining whether a width of a current coding unit is equal to a height of the current coding unit; setting a width of a sub-block to a value obtained by dividing the width of the current coding unit by N and setting a height of the sub-block to a value obtained by dividing the height of the current coding unit by N when the width of the current coding unit is equal to the height of the current coding unit; finding constants M and N with which the current coding unit is able to be divided into N×M square blocks, setting the width of the sub-block to a value obtained by dividing the width of the current coding unit by N, and setting the height of the sub-block to a value obtained by dividing the height of the current coding unit by N when the width of the current coding unit is not equal to the height of the current coding unit; and dividing a current coding block into a plurality of sub-blocks using input data including the width and height of the current coding unit and the width and the height of the sub-block.

In order to accomplish the objective, according to one aspect of the present invention, a video coding method and apparatus include: dividing a coding unit into a plurality of sub-blocks; and sequentially performing intra prediction on each of the sub-blocks, wherein reference sample buffers for the respective sub-blocks are differently constructed.

In order to accomplish the objective, according to one aspect of the present invention, a video coding method and apparatus include: dividing a coding unit into a plurality of sub-blocks; and sequentially performing intra prediction on each of the sub-blocks, wherein when constructing reference sample buffers for the respective sub-blocks, reconstructed samples of one or more sub-blocks spatially adjacent to a corresponding one of the sub-blocks are used as reference samples.

Advantageous Effects

When performing intra prediction on a target block to be coded or decoded, the present invention divides the target block into a plurality of sub-blocks and sequentially per-forms intra prediction on each of the sub-blocks, thereby improving spatial similarity between pixels and prediction performance.

When performing intra prediction on a target block to be coded or decoded, the present invention divides the target block into a plurality of sub-blocks and performs intra prediction on each of the sub-blocks, thereby reducing the number of spatially neighboring pixels to be used as reference pixels, resulting in a reduction in the size of a reference pixel buffer.

BEST MODE

Figure 1:
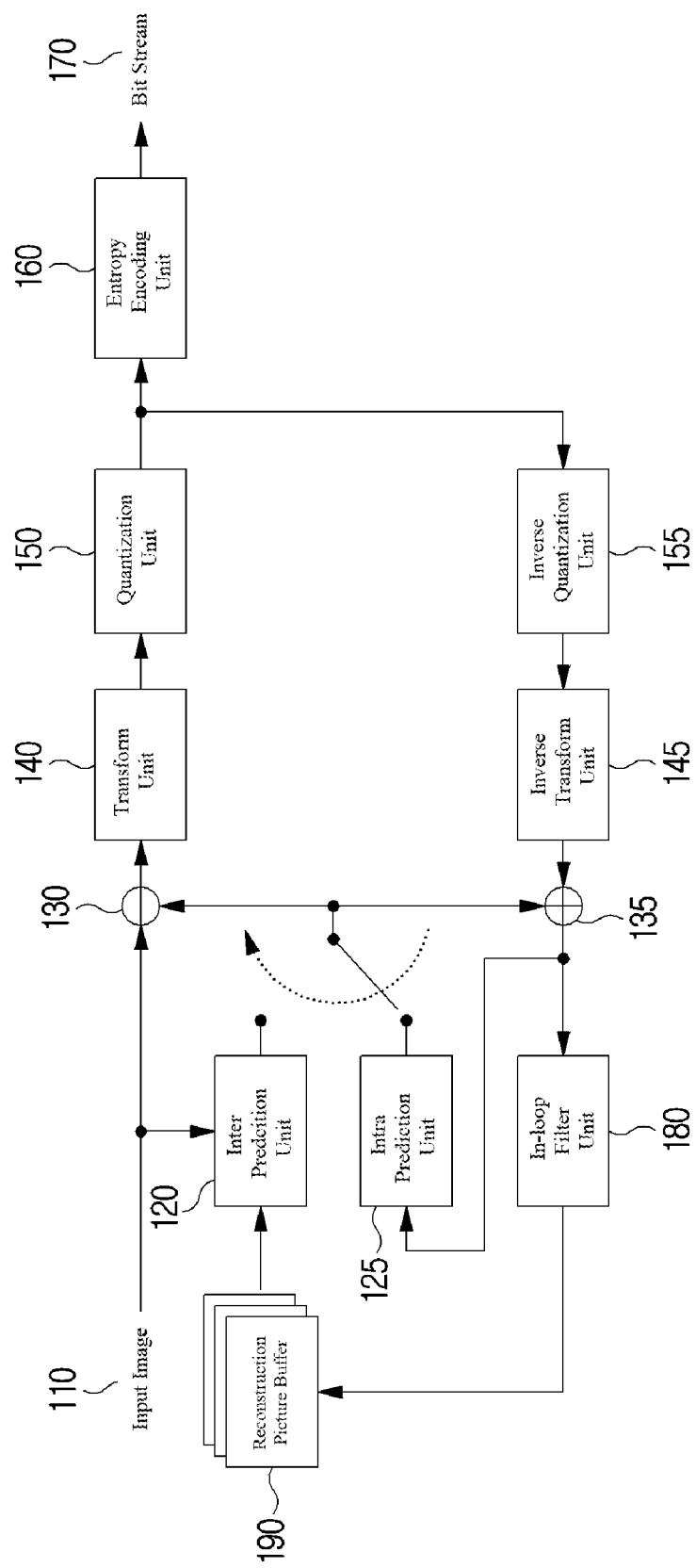
FIG. 1 is a block diagram illustrating the construction of a video coding apparatus according to one embodiment of the present invention.

A video coding method and apparatus according to one embodiment of the present invention include: determining whether to perform sub-block-based intra prediction on a current coding unit; performing sub-block-based intra prediction on the current coding unit when a result of the determining whether to perform sub-block-based intra prediction is a value of "true"; and performing block-based intra prediction on the current coding unit when the result of the determining whether to perform sub-block-based intra prediction is a value of "false".

A video coding method and apparatus according to one embodiment of the present invention include: comparing a size of a current coding unit and a size of a smallest coding unit for which sub-block-based intra prediction is allowed; and setting a value of a flag indicating whether to perform sub-block-based intra prediction to "true" or "false" depending on a result of the comparison between the size of the current coding unit and the size of the smallest coding unit for which sub-block-based intra prediction is allowed.

A video coding method and apparatus according to one embodiment of the present invention include: determining whether a sub-block-based intra prediction is allowed for a current sequence, a current picture, or a current slice; comparing a size of a current coding unit and a size of a smallest coding unit for which sub-block-based intra prediction is allowed; and setting a value of a flag indicating whether to perform sub-block-based intra prediction to "true" or "false" depending on a result of the comparison between the size of the current coding unit and the size of the smallest coding unit for which sub-block-based intra prediction is allowed.

A video coding method and apparatus according to one embodiment of the present invention include: dividing one coding unit into a plurality of sub-blocks; performing intra prediction on each of the sub-blocks of the current coding unit; and iterating the dividing of one coding unit and the performing of the intra prediction with respect to each of the sub-blocks of the current coding unit.

A video coding method and apparatus according to one embodiment of the present invention include: determining a minimum value among a width and a height of a current coding unit; setting a width of a sub-block to the minimum value among the width and the height of the current coding unit; setting a height of the sub-block to the minimum value among the width and the height of the current coding unit; and dividing a current coding block into a plurality of sub-blocks using input data including the width and height of the current coding unit and the width and height of the sub-block.

A video coding method and apparatus according to one embodiment of the present invention comprises: determining a maximum value of a width and a height of a current coding unit; setting a width of a sub-block to a value obtained by dividing the width of the current coding unit by N and setting a height of the sub-block to the height of the current coding unit when the width of the current coding unit is the maximum value; setting the width of the sub-block to the width of the current coding unit and setting the height of the sub-block to a value obtained by dividing the height of the current coding unit by N when the height of the current coding unit is the maximum value; and dividing a current coding block into a plurality of sub-blocks using input data including the width and height of the current coding unit and the width and the height of the sub-block.

A video coding method and apparatus according to one embodiment of the present invention include: determining whether a width of a current coding unit is equal to a height of the current coding unit; setting a width of a sub-block to a value obtained by dividing the width of the current coding unit by N and setting a height of the sub-block to a value obtained by dividing the height of the current coding unit by N when the width of the current coding unit is equal to the height of the current coding unit; when the width of the current coding unit is not equal to the height of the current coding unit, setting the width of the sub-block to a value obtained by dividing the width of the current coding unit by N, and setting the height of the sub-block to a value obtained by dividing the height of the current coding unit by N. Herein, N and M being constants that divide the current block into N×M number of square blocks; and dividing a current coding block into a plurality of sub-blocks using input data including the width and height of the current coding unit and the width and the height of the sub-block.

A video coding method and apparatus according to one embodiment of the present invention include: dividing one coding unit into a plurality of sub-blocks; and sequentially performing intra prediction on each of the sub-blocks, wherein reference sample buffers for the respective sub-blocks are differently constructed.

A video coding method and apparatus according to one embodiment of the present invention include: dividing one coding unit into a plurality of sub-blocks; and sequentially performing intra prediction on each of the sub-blocks, wherein when constructing reference sample buffers for the respective sub-blocks, reconstructed samples of one or more sub-blocks spatially adjacent to a corresponding one of the sub-blocks are used as reference samples.

MODE FOR THE INVENTION

Hereinafter, preferred modes of the present invention will be described in detail with reference to the accompanying drawings in such a manner that the ordinarily skilled in the art can easily implement the present invention. However the present invention is not limited to the preferred modes because the present invention can be implemented in various forms. Throughout the drawings, elements that are not related to the description of the present invention are omitted to clearly illustrate the claimed invention, and like elements are designated by like reference numerals.

When an element is described as being "connected to", "combined with", or "coupled to" another element, it should be understood that the element may be connected to, combined with, or coupled to another element directly or with another element interposing therebetween It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, and/or components.

Throughout the description in the present specification, the expression "step of doing" or "step of something" does not mean "step for doing". The terms "first", "second", etc. are used in the present specification to describe various elements, and the elements are not to be construed as being limited to the terms. These terms are used only for the purpose of distinguishing a constitutive element from another constitutive element.

In addition, components described in exemplary embodiments of the present invention are independently shown only in order to indicate that they perform different characteristic functions. Therefore, the components that are independently shown do not mean that each of the components is implemented as one piece of hardware or software. That is, although each component is described as one component for convenience of description, at least two components may be combined to form one component, or one component may be divided into a plurality of components to perform a function. Embodiments in which two or more functions that are performed by respective independent components in one embodiment are performed by an integrated component, and embodiments in which one function that is performed by two or more components in one embodiment are performed by an integrated component, also fall within the scope of the present invention as long as they do not depart from the spirit of the present invention.

The terms "~part", "~er/or", "~unit", "~module", "~block" and the like mean a unit for processing at least one function or operation and may be implemented as a piece of hardware, a piece of software, or a combination of hardware and software.

A coding block refers to a group of target pixels on which coding or decoding is to be performed. That is, it is a unit of processing. The term "coding block" is also referred to as the term "coding unit" in some cases. The term "coding unit" is a collective term indicating both a coding unit (CU) and a coding block (CB).

Quadtree partition means that one block is divided into four independent coding units (CUs) and binary partition means that one block is divided into two independent coding units (CUs).

Hereinafter, a video coding method and a video coding apparatus each of which uses a sub-block-based intra prediction technique according to one embodiment of the present invention will be described in detail with reference to FIG. 7.

FIG. 1 is a block diagram illustrating the construction of a video coding method and apparatus according to one embodiment of the present invention.

According to one embodiment of the present invention, a video coding method and apparatus include an inter prediction unit 120, an intra prediction unit 125, a subtraction unit 130, a transform unit 140, a quantization unit 150, an entropy coding unit 160, an inverse transform unit 145, an inverse quantization unit 155, an addition unit 135, an in-loop filter unit 180, and a reconstructed picture buffer 190.

The inter prediction unit 120 generates a prediction signal by performing motion estimation, with the use of an input picture 110 and a reconstructed picture stored in the reconstructed picture buffer 190.

The intra prediction unit 125 generates a prediction signal by performing spatial prediction with the use of a pixel value of a reconstructed neighboring block spatially adjacent to a current block to be coded.

The subtraction unit 130 generates a residual signal by comparing the input picture and the prediction signal output from the inter prediction unit 120 and the intra prediction unit 125.

The transform unit 140 and the quantization unit 150 perform respectively transform and quantization on the residual signal output from the subtraction unit 130, thereby generating a quantized coefficient.

The entropy coding unit 160 performs entropy coding on syntax elements defined in a video compression standard and on coding information such as the quantized coefficient and outputs a bit stream.

The inverse transform unit 145 and the inverse quantization unit 155 receive the quantized coefficients and respectively perform inverse transform and inverse quantization on the quantized coefficients, and output a reconstructed residual signal.

The addition unit 135 generates a reconstructed signal by adding the prediction signal output from the inter prediction unit 120 or the intra prediction unit 125 and the reconstructed residual.

The reconstructed signal is transferred to the in-loop filter unit 180. The in-loop filter unit 180 performs filtering on the reconstructed signal with the use of one or more in-loop filters such as a deblocking filter, sample adaptive offset (SAO), and an adaptive loop filter (ALF), thereby generating a final reconstructed signal which is in turn stored in the reconstructed picture buffer 190. The reconstructed signal stored in the reconstructed picture buffer 190 may be used as a reference signal by the inter prediction unit 120.

Figure 2:
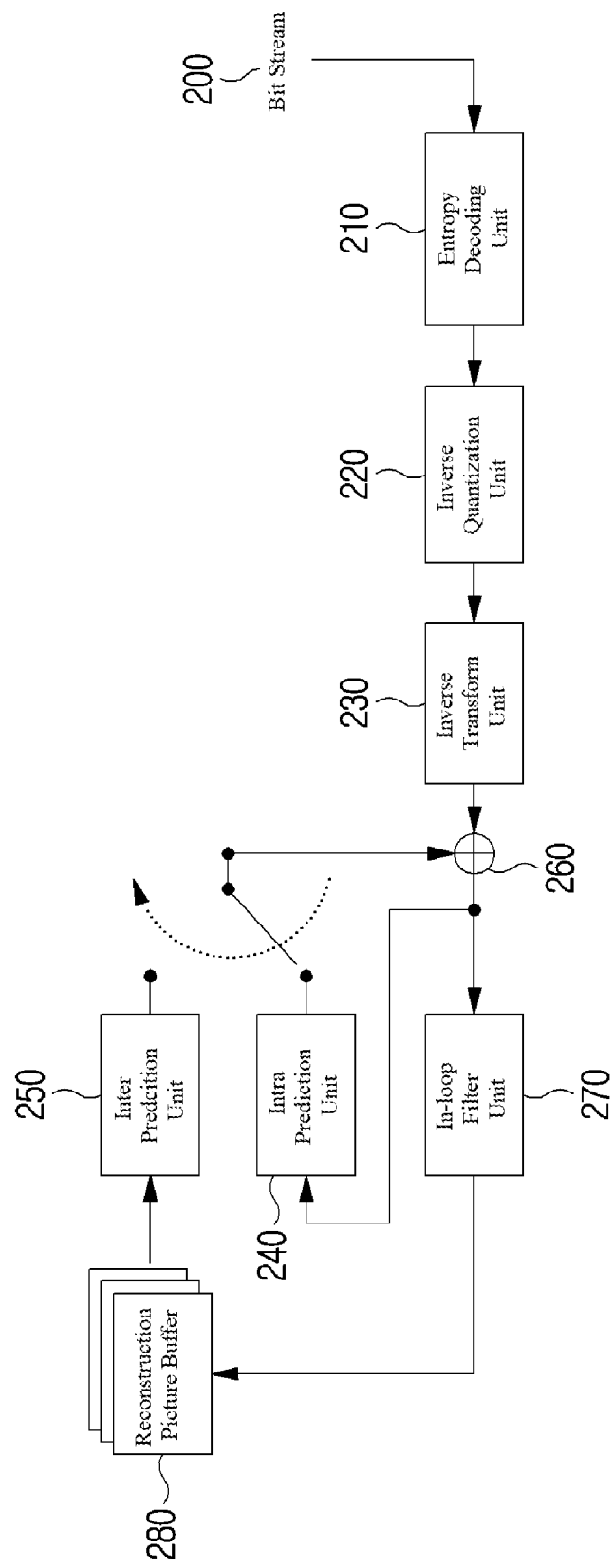
FIG. 2 is a block diagram illustrating the construction of a video decoding apparatus according to one embodiment of the present invention.

FIG. 2 is a block diagram illustrating the construction of a video decoding apparatus and method according to one embodiment of the present invention.

According to one embodiment, a video decoding apparatus and method include: an entropy decoding unit 210, an inverse quantization unit 220, an inverse transform unit 230, an intra prediction unit 240, an inter prediction unit 250, an addition unit 260, an in-loop filter unit 270, and a reconstructed picture buffer 280.

The entropy decoding unit 210 decodes a bit stream 220 and outputs decoding information such as syntax elements and quantized coefficients.

The inverse quantization unit 220 and the inverse transform unit 230 receive the quantized coefficients and respectively perform inverse quantization and inverse transform on the quantized coefficients, and outputs a residual signal.

The intra prediction unit 240 generates a prediction signal by performing spatial prediction with the use of a pixel value of a decoded neighboring block spatially adjacent to a current block to be decoded.

The inter prediction unit 250 generates a prediction signal by performing motion compensation with the use of a motion vector extracted from the bit stream and a reconstructed picture stored in the reconstructed picture buffer.

The prediction signals generated by the intra prediction unit 240 and the inter prediction unit 250 are input to the addition unit 260 and are thus added to the residual signal. Thus, reconstructed signals are generated.

The reconstructed signal is transferred to the in-loop filter unit 270. The in-loop filter unit 180 performs filtering on the reconstructed signal with the use of one or more in-loop filters such as a deblocking filter, sample adaptive offset (SAG), and an adaptive loop filter (ALF), thereby generating a final reconstructed signal which is in turn stored in the reconstructed picture buffer 190. The reconstructed signal stored in the reconstructed picture buffer 190 may be used as a reference signal by the inter prediction unit 120.

Figure 3:
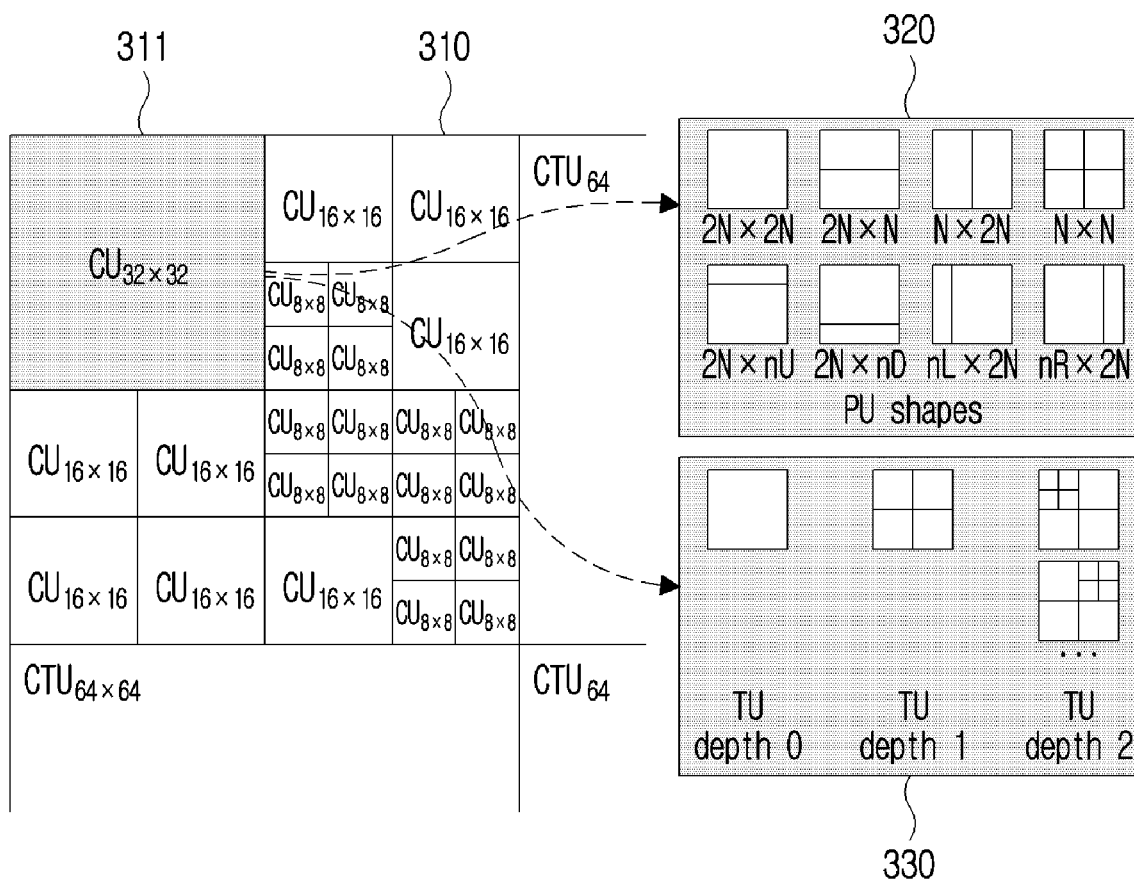
FIG. 3 is a view illustrating the concepts of a quadtree block structure, a coding unit (CU), a prediction unit (CU), and a transform unit (TU) used in one embodiment of the present invention.
Figure 3:
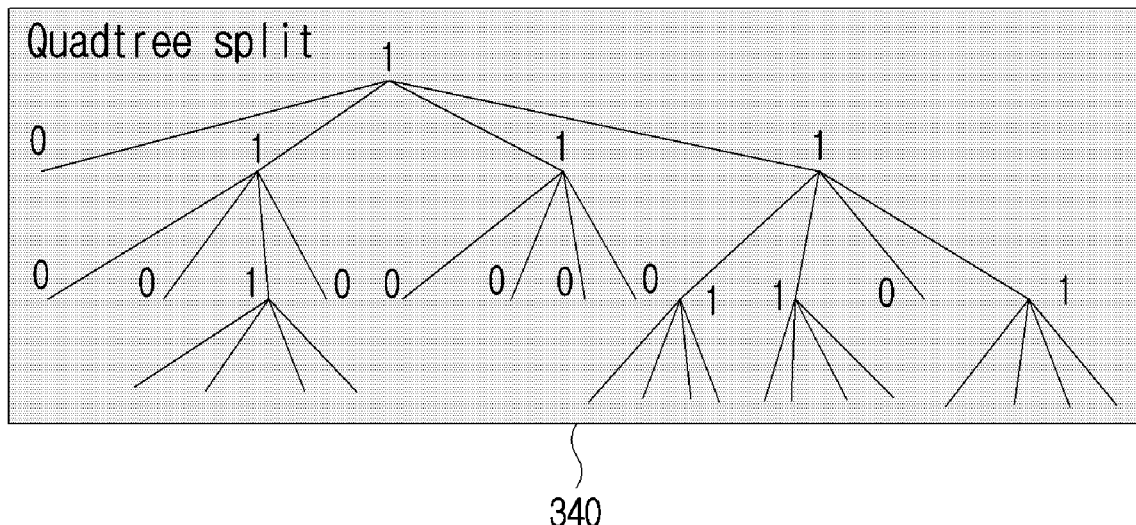

FIG. 3 illustrates the concepts of a quadtree block structure, a coding unit (CU), a prediction unit (CU), and a transform unit (TU) according to one embodiment of the present invention.

According to one embodiment, the quadtree block structure refers to a case where a block is divided into four smaller blocks. It also refers to a case where each of four smaller blocks is treated as one block and is divided into four smaller blocks again.

In one embodiment, a block having a quadtree partition structure is referred to as a coding unit (CU). In CU quadtree coding, a root-level CU is referred to as a coding tree unit (CTU). As an example of a CU quadtree partition structure, when a 64×64 CTU 310 is divided into four CUs as illustrated in FIG. 3, this quad tree is indicated by quadtree partition information 340. After the 64×64 CTU 310 is divided into four 32×32 CUs, each of the 32×32 CUs may be further quadtree-partitioned or may not be partitioned.

According to one embodiment, information about whether a block has a quadtree partition structure may be a flag having a value of 0 or 1. For example, a flag having a value of 1 represents a case where a block is quadtree-partitioned, and a flag having a value of 0 represents a case where a block is not quadtree-partitioned. However, at a lowest-level block, the information about whether to partition the lowest-level block is not necessarily signaled.

According to one embodiment, one coding unit (CU) is referred to as a prediction unit (PU) when the CU is used for prediction or is referred to as a transform unit (TU) when the CU is used for transform.

There are 8 modes of PUs which are units of prediction according to one embodiment. The 8 modes include 2N×2N, 2N×N, N×2N, N×N, 2N×nU, 2N×nD, nL×2N, and nR×2N (N is an arbitrary length). For example, 2N×N refers to modes in which a block is divided into a 2N×(1/2)N block and a 2N×(2/3)N block, and 2N×nD refers to modes in which one block is divided into a 2N×(3/2)N block and a 2N×(1/2)N block. In addition, nL×2N refers to modes in which a block is divided into a (1/2)N×2N block and (3/2)N×2N block, and nR×2RN refers to modes in which a block is divided into a (3/2)N×2N block and a (1/2)N×2N block.

A TU which is the basic unit for transform. Each TU can be recursively quadtree-partitioned into four smaller TUs like CUs. According to one embodiment, information about whether a TU is quadtree-partitioned is a flag having a value of 0 or 1. For example, a flag having a value of 1 represents a case where a TU is quadtree-partitioned and a flag having a value of 0 represents a case where a TU is not quadtree-partitioned. However, a flag indicating the partition structure of a lowest-level TU is not necessarily signaled.

Figure 4:
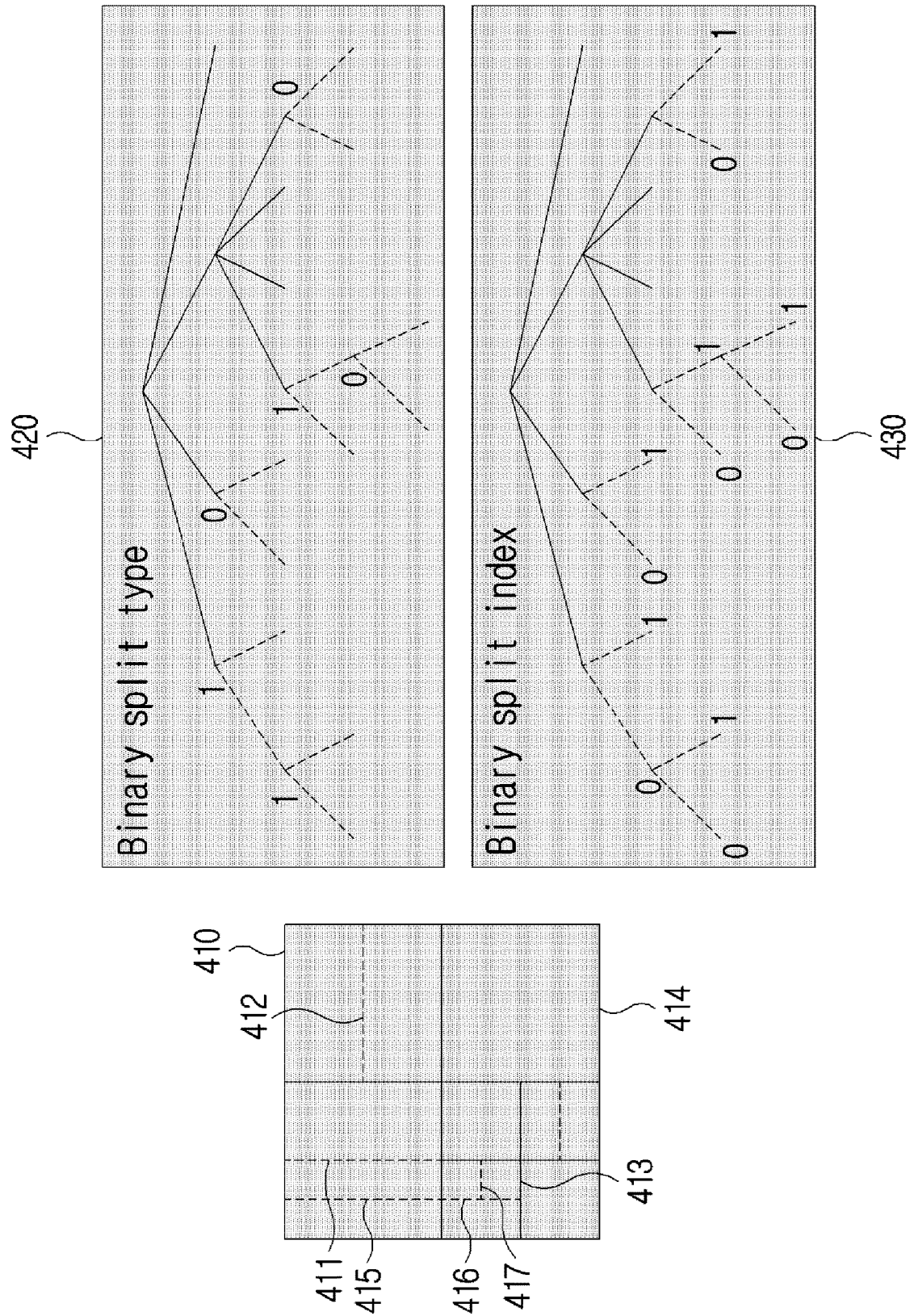
FIG. 4 is a view illustrating the concepts of a QTBT block structure, binary partition types, and binary partition indexes used in embodiment of the present invention.

FIG. 4 illustrates the concepts of a QTBT block structure, binary partition types, and binary partition block indexes according to the binary partition in embodiments of the present invention.

When a block 410 is divided using QTBT block partitioning, the block 410 (root node) is partitioned into four smaller square blocks by using QTBT block partitioning. Then, in QTBT block partitioning, binarytree partitioning may be started from at least one of the first-depth leaf nodes generated through the quadtree block partitioning.

Referring to FIG. 4, the top left first-depth leaf node resulting from the quadtree partitioning of the root node 410 undergoes vertical binarytree partitioning 411, which results into two second-depth leaf nodes. Then, the left second-depth leaf node resulting from the vertical binary tree partitioning 411 undergoes also vertical binary tree partitioning 415.

The top right first-depth leaf node resulting from the quadtree partitioning of the root node 410 undergoes horizontal binarytree partitioning 412 which results in two second-depth leaf nodes. The leaf nodes resulting from the horizontal binary tree partitioning 412 do not undergo any partitioning.

The bottom left first-depth leaf node resulting from the quadtree partitioning of the root node 410 first undergoes quadtree partitioning 413, which results in four second-depth leaf nodes. The top left second-depth leaf node resulting from the quadtree partitioning of the bottom left first-depth leaf node undergoes vertical binarytree partitioning 416, which results in two third-depth leaf nodes. Then, the right third-depth leaf node resulting from the vertical binary tree partitioning 416 then undergoes horizontal binary tree partitioning 417.

The bottom right first-depth leaf node 414 resulting from the quadtree partitioning of the root node 410 is not binarytree-partitioned.

As described above, among leaf nodes resulting from quadtree partitioning, some may be binarytree-partitioned but the other some may not be binarytree partitioned. When a leaf node is binarytree-partitioned, horizontal binarytree partitioning or vertical binarytree partitioning is selectively used. Lower-level leaf nodes resulting from binarytree partitioning may be further binarytree-partitioned or not. However, any leaf node resulting from binary-tree partitioning cannot be quadtree-partitioned.

In FIG. 4, a diagram 420 shows binary partition types which depend on the direction of binary block partitioning. The binary partition type is also referred to as binary partition direction, binary partition shape, or binary partition mode. When one block that is partitioned in a vertical or a horizontal direction, it is designated by 0 or 1. According to one embodiment of the present invention, vertical binary partitioning is designated by 1 and horizontal binary partitioning is designated by 0.

In FIG. 4, a diagram 430 shows binary partition indexes for binarytree-partitioned blocks. The binary partition indexes may be represented by 0 and 1, according to the coding order of two blocks that are generated through binarytree partitioning. In the diagram 430 of FIG. 4, of the two blocks resulting from binarytree partitioning, a binary partition index of 0 represents the first binary partition block of two blocks and a binary partition index of 1 represents the second binary partition block.

Figure 5:
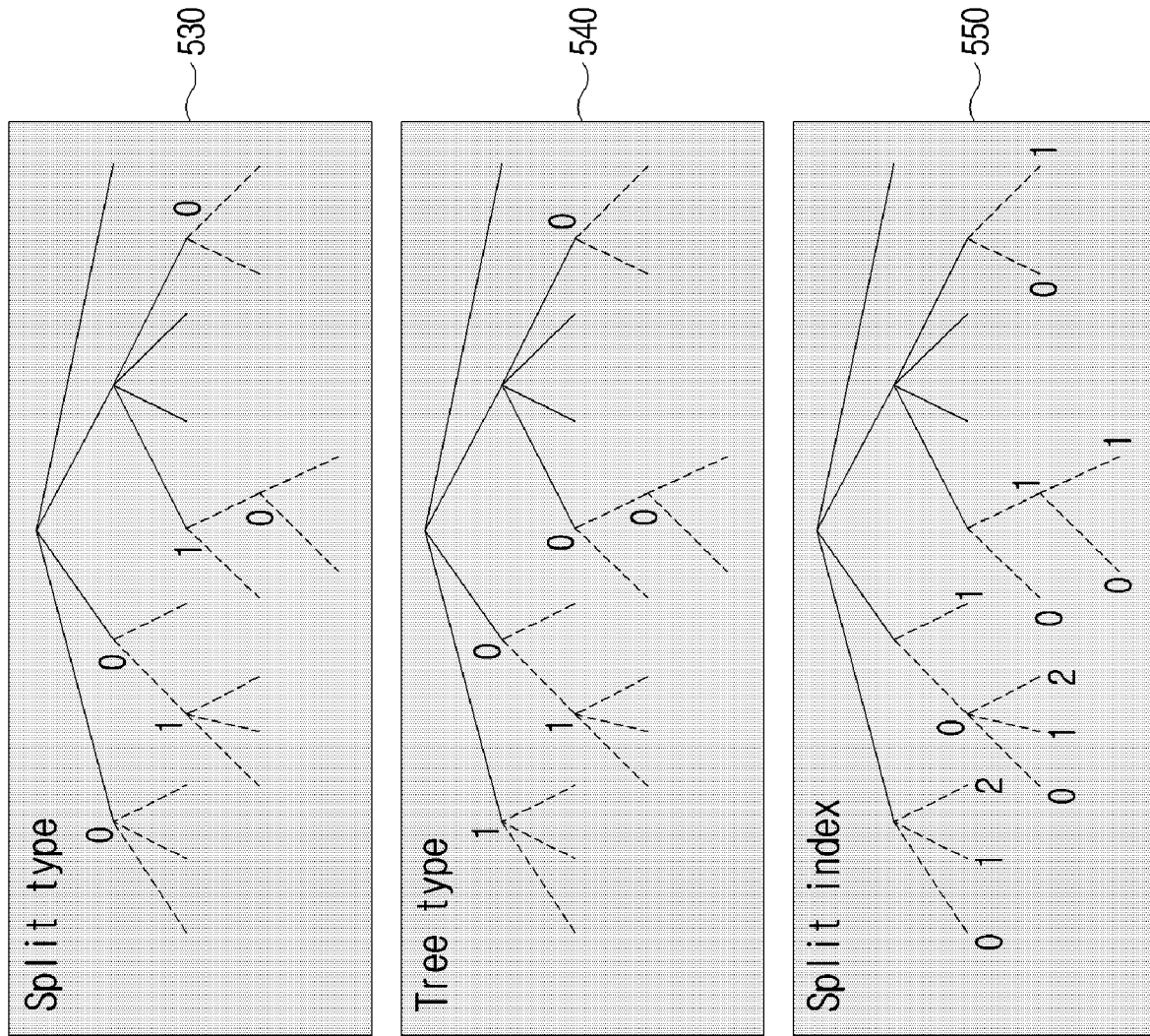
FIG. 5 is a view illustrating the concepts of an MTT block structure, MTT partition types, and indexes of blocks resulting from binary partitioning and triple partitioning, used in embodiment of the present invention.
Figure 5:
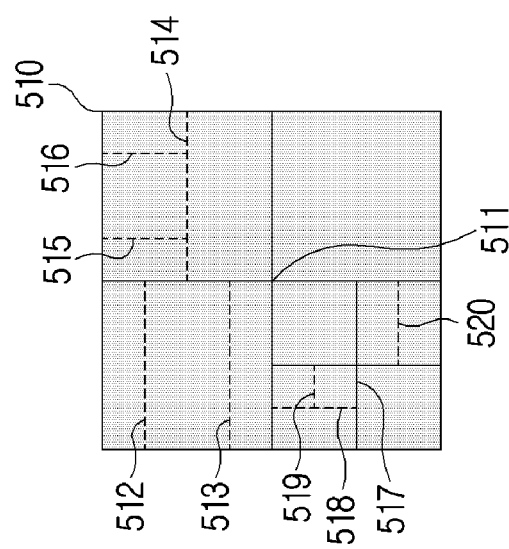

FIG. 5 illustrates the concepts of an MTT block structure, partition types, and indexes indicating blocks resulting from binary partitioning and tripletree partitioning, used in embodiment of the present invention.

When there is a block 510 divided by using an MTT block partition, the block 510 (root node) is first quadtree-partitioned into four smaller square blocks which are called first-depth leaf nodes. Then, binarytree partitioning or tripletree partitioning is started from at least one of the first-depth leaf nodes generated through the quadtree block partitioning.

Referring to FIG. 5, the top left block which is one of the four first-depth leaf nodes resulting from quadtree partitioning is horizontally tripletree-partitioned (512 and 513), which results in three second-depth leaf nodes having the same width, of N. The tree second-depth leaf nodes resulting from the tripletree partitioning (512 and 513) have heights N/4, N/2, and N/4, respectively.

The top right first-depth leaf node resulting from the quadtree partitioning of the root node 510 undergoes horizontal binarytree partitioning 514, which results in two second-depth leaf nodes. Then, the top second-depth leaf node of the two second-depth leaf nodes undergoes vertical triple partitioning (515 and 516), which results in three third-depth leaf nodes. The three third-depth leaf nodes resulting from the vertical triple partitioning (515 and 516) have the same height of M and different widths of M/4, M/2, and M/4, respectively.

In FIG. 5, a diagram 530 shows a partition type (split type) which depend on the direction of binary and triple block partitioning. The partition type is also referred to as binary and triple partition direction, binary and triple partition shape, or binary and triple partition mode. When one block that is partitioned in a vertical or a horizontal direction, it is designated by 0 or 1. According to one embodiment of the present invention, vertical block partitioning is designated by 1 and horizontal block partitioning is designated by 0.

In FIG. 5, a diagram 550 shows a partition index (split index) for blocks resulting from binary and triple partitioning. The binary and triple partition indexes may be represented by 0, 1, and 2 the coding order of coding blocks that are generated through binary partitioning. In the diagram 550 of FIG. 5, among two blocks are generated through binary partitioning, the first binary partition block is designated by an index of 0 and the second binary partition block is designated by an index of 1. Among three blocks are generated through triple partitioning, the first triple partition block is designated by an index of 0, the second triple partition block is designated by an index of 1, and the third triple partition block is designated by an index of 2.

Figure 6:
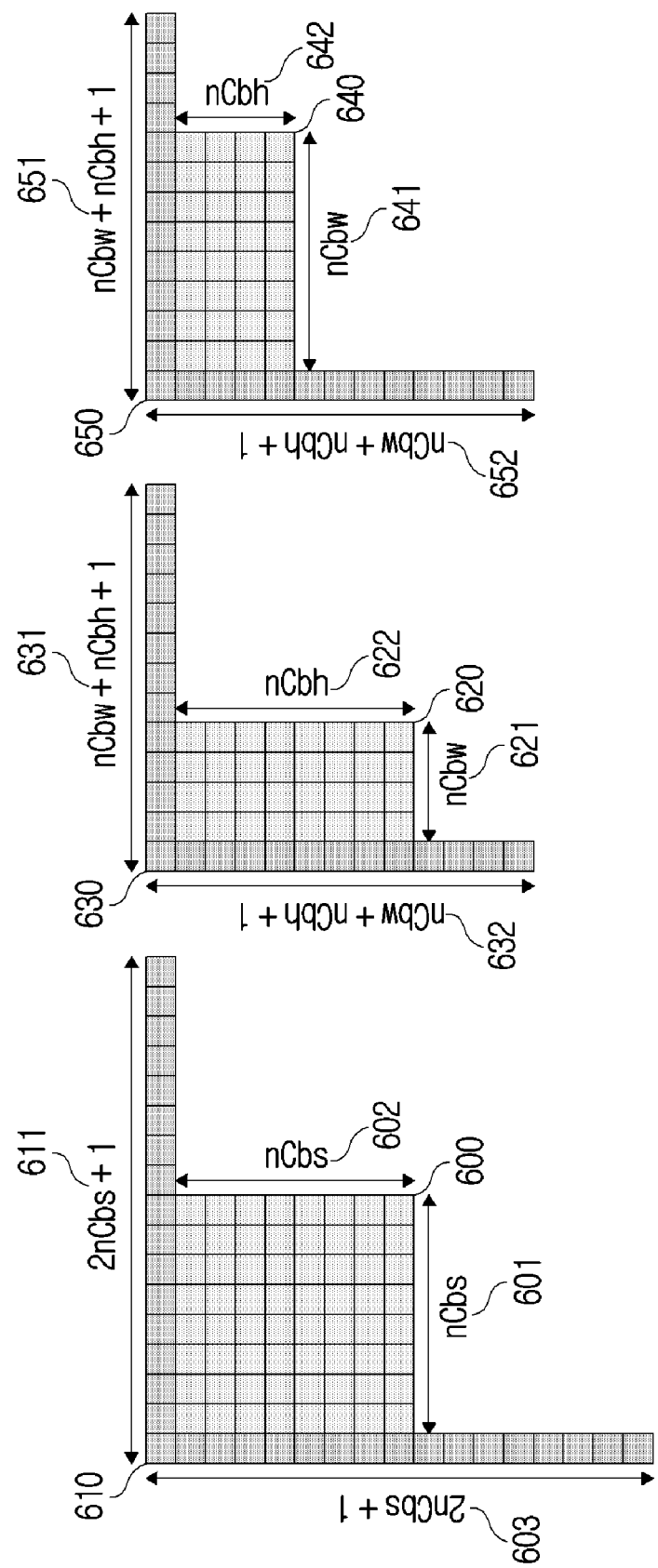
FIG. 6 is a view illustrating an example of reference of samples determined according to the shape and size of a current coding block to be coded or decoded, used in one embodiment of the present invention.

FIG. 6 illustrates an example of reference samples determined according to the shape and size of a current coding block to be encoded or decoded, used in one embodiment of the present invention.

When a current coding block to be coded or decoded is a square block 600 having a width 601 and a height 602 which are equal (in which it is assumed that the width and height is nCbs), intra prediction for the current coding block is performed using upper reference samples 611 corresponding to a width of 2nCbs+1 and left reference samples 612 corresponding to a height of 2nCbs+1. When the upper reference samples 611 and the left reference samples 612 consist of one reference sample buffer 610, the reference sample buffer has a size of 4nCbs+1 because the top left reference sample overlaps.

When a current coding block to be coded or decoded is a non-square block 620 having a width and a height that differ from each other, the size of a reference sample buffer 630 or 650 is determined depending on the width 621 or 642 and the height 622 or 642 of the non-square block 620 or 640.

When a current coding block to be encoded or decoded is a non-square block 620 or 640 having a width of nCbw (621 or 641) and a height of nCbh (622 or 642), intra prediction for the current coding block is performed using upper reference samples 631 or 651 corresponding to a width of nCbW+nCbH+1 and left reference samples 632 or 652 corresponding to a height of cCbw+nCbh+1. When the upper reference samples 631 or 651 and the left reference samples 632 or 652 consist of one reference sample buffer 630 or 650, the reference sample buffer has a size of 2nCbw+2nCbh+1 because the top left reference sample overlaps.

Figure 7:
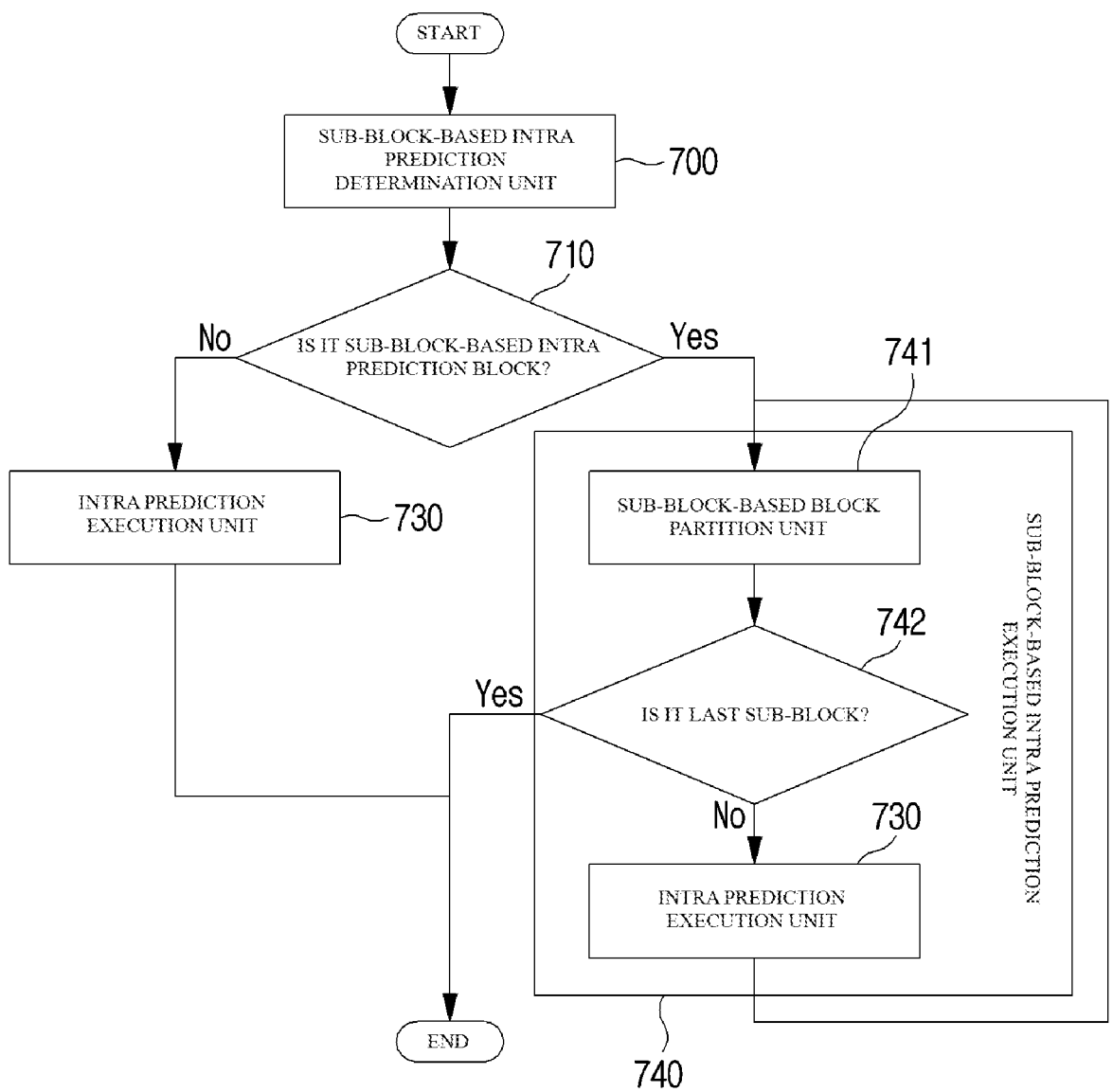
FIG. 7 is a flowchart illustrating sequential steps executed for sub-block-based intra prediction according to one embodiment of the present invention.

FIG. 7 is a flowchart illustrating the execution of sub-block-based intra prediction according to one embodiment of the present invention.

The execution of the sub-block-based intra prediction includes: a sub-block-based intra prediction determination unit 700 that determines whether to perform sub-block-based intra prediction on one coding unit (CU); a sub-block-based intra prediction execution unit 740 that divides the current coding unit into two or more sub-blocks and sequentially performs intra prediction on each of the two or more sub-blocks included in the current coding unit; and an intra prediction unit 730 that performs intra prediction on the current coding unit without dividing the current coding unit into sub-blocks.

The sub-block-based intra prediction determination unit 700 according to one embodiment determines whether to perform sub-block-based intra prediction on the basis of coding information of the current coding unit. A block width and height of the current coding unit may be used as the coding information for determining whether to perform sub-block-based intra prediction on the current coding unit. By comparing a block size that can be derived from the width and the height of the current coding unit and a maximum/minimum block size information for which sub-block-based intra prediction is allowed, whether to perform sub-block-based intra prediction on the current coding unit is determined.

According to one embodiment, the maximum/minimum block size information for which the sub-block-based intra prediction is allowed may be signaled as a high-level syntax. The high-level syntax means a syntax included in a sequence parameter set (SPS), a picture parameter set (PPS), a slice header, etc. With the use of this syntax, information indicating whether sub-block-based intra prediction is to be performed is signaled. In addition, when the information indicates that sub-block-based intra prediction is performed, the maximum/minimum block size information allowing the sub-block-based intra prediction is signaled. The reason why the determination of whether sub-block-based intra prediction is to be performed depends on the block size is because the coding efficiency depends on the block size. That is, when a block size is greater or smaller than a specific size, sub-block-based intra prediction reduces the coding efficiency compared to block-based intra prediction.

According to a result of determination made by the sub-block-based intra prediction determination unit 700, the sub-block-based intra prediction proposed by the present invention is performed in different manners described below. In a case where block-based intra prediction is performed on the current coding unit without dividing the current coding unit into sub-blocks, the intra prediction execution unit 730 is directly called for the current coding unit. On the other hand, in a case where the current coding unit is divided into two or more sub-blocks each of which undergoes intra prediction, the intra prediction execution unit 730 is called via the sub-block-based intra prediction execution unit 740 for each of the sub-blocks included in the current coding unit.

In the flowchart of the sub-block-based intra prediction proposed by the present invention, the intra prediction execution unit 730 is a collective term including a step of performing prediction using reference samples spatially adjacent to one block to generate a prediction signal, and a step of performing final prediction to generate a reconstructed sample by adding the prediction signal and a reconstructed residual signal obtained through inverse quantization and inverse transform. A sub-block-based processing operation that is used in the sub-block-based intra prediction according to the present invention means that the video coding process, in which a final reconstruction block is obtained by adding a prediction block composed of prediction signals obtained by applying a prediction technique to one coding block and a residual block composed of residual signals, is performed in units of sub-blocks.

The sub-block-based intra prediction execution unit 740 according to one embodiment includes: a sub-block-based block partition unit 741 that divides a current coding unit into two or more sub-blocks; a last-sub-block determination unit 742 that determines, for one sub-block to perform intra prediction, whether a current sub-block is a last sub-block among the two or more sub-blocks included in the current coding unit; and an intra prediction execution unit 730 that performs intra prediction on the current sub-block.

According to one embodiment, the sub-block-based block partition unit 741 divides a current coding unit into two or more sub-blocks. The current coding unit is divided into two or more sub-blocks by using the block width and the block height of the current coding unit.

Figure 11:
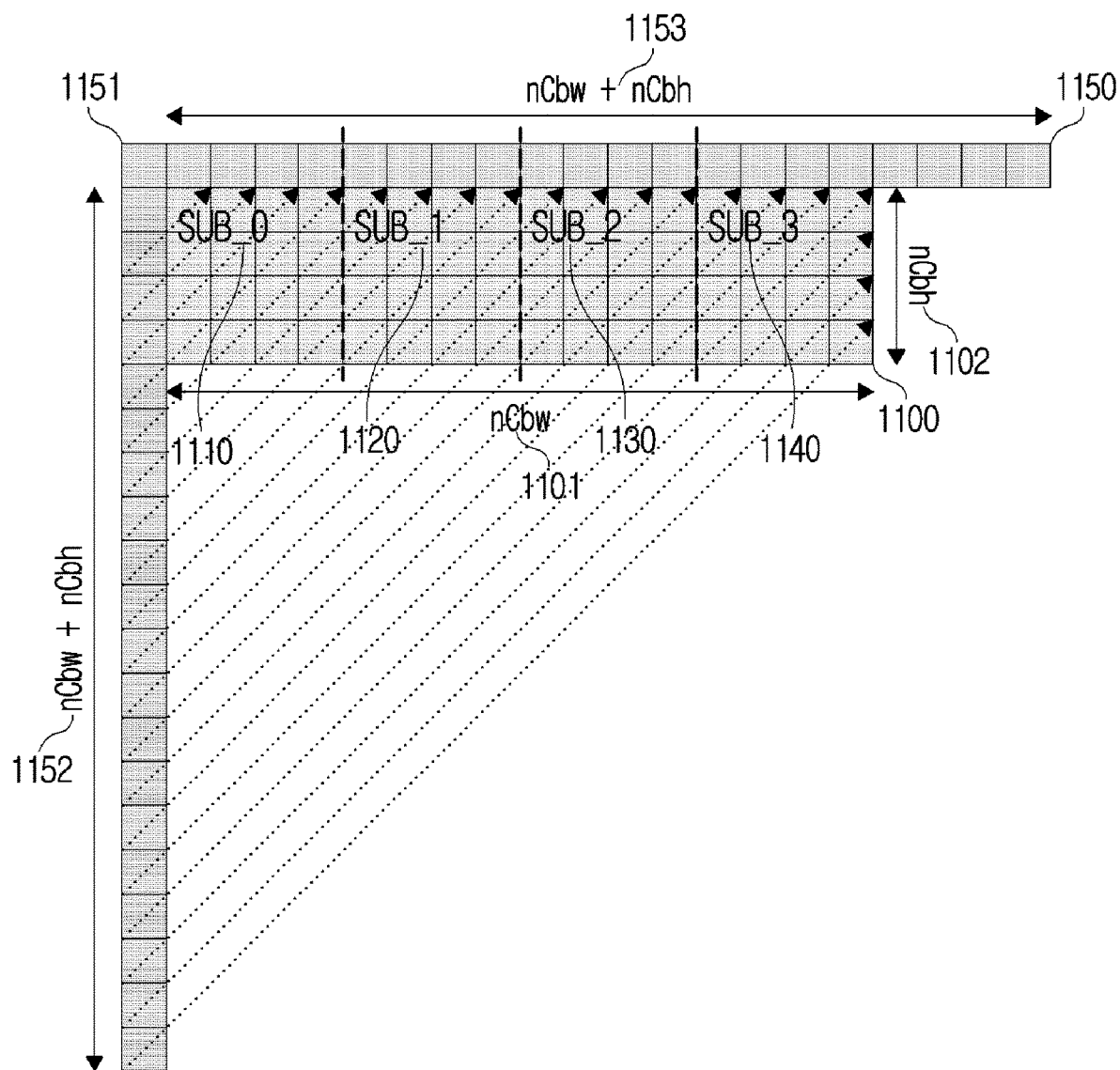
FIGS. 11 to 15 are diagrams illustrating square sub-blocks generated from a coding block, each square sub-block having each side that has the same size as a smaller one of a block width and a block height of the coding block, according to one embodiment of the present invention.

According to one embodiment, a method of dividing a current coding unit into two or more sub-blocks includes a method of dividing a current coding unit into square blocks. Each side of the square blocks has a size equal to a smaller value among a block width and a block height of the current coding unit. FIG. 11 illustrates an example of a coding unit with a size of 16×4. The coding unit is divided into four square sub-blocks each side of which has a size equal to a smaller size among a block width and a block height of the coding unit.

Figure 17:
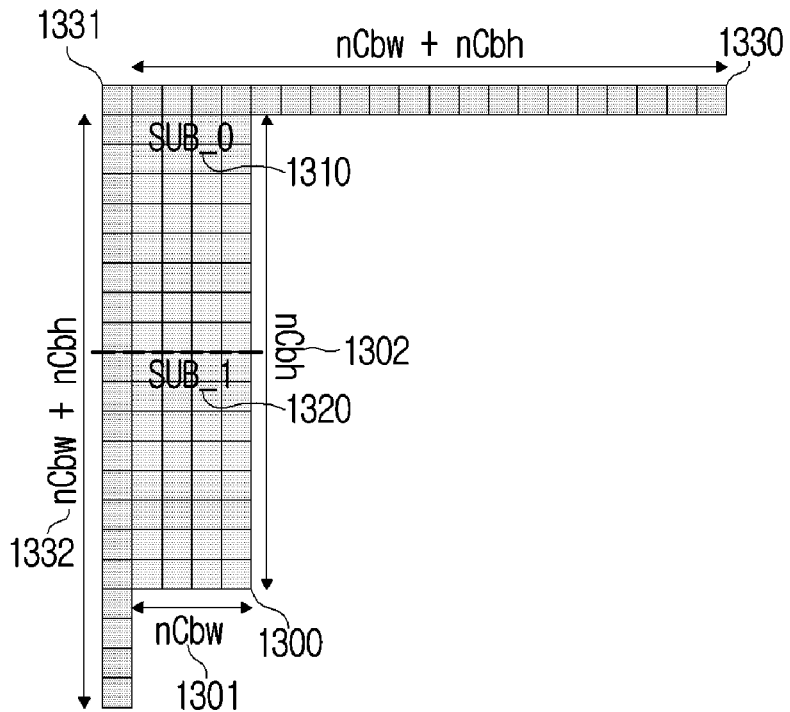
FIG. 17 is a diagram illustrating an example in which a coding block is divided into N square or rectangular blocks in which the division is performed such that a larger one among the block width and the block height of the coding block is divided by N.
Figure 17:
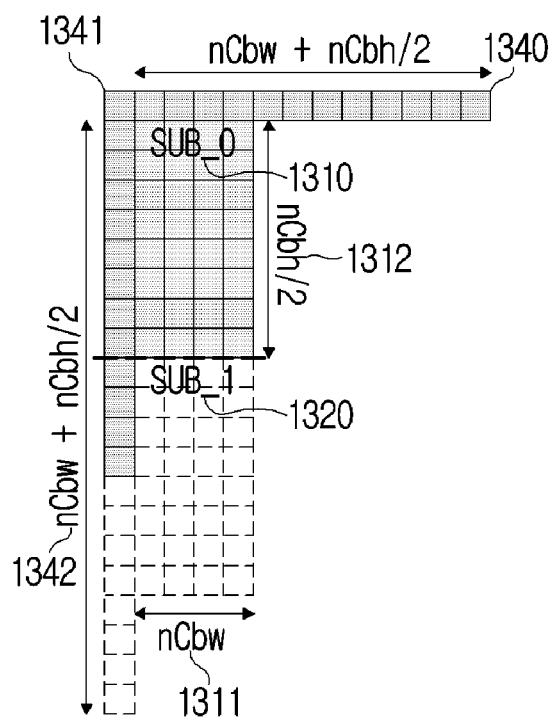
Figure 17:
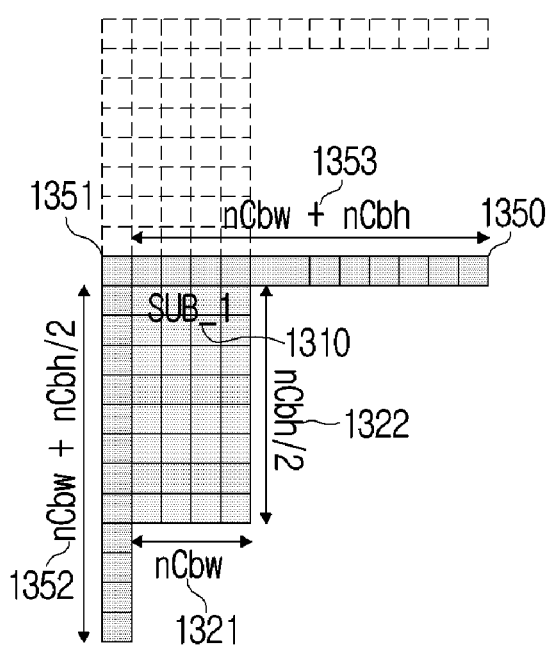

According to one embodiment, a method of dividing a current coding unit into two or more sub-blocks includes a method of dividing a current coding unit into two or more square or rectangular blocks. In this case, the square or rectangular blocks are generated by dividing a larger value among a block width and a block height of a current coding block by N. N is a specific constant value and may be a multiple (for example, 2, 4, . . . ) of two. FIG. 17 illustrates an example in which a coding unit (for example, a 4×16 block) is divided into two non-square sub-blocks in a manner that a larger size among a block height and a block width of the current coding unit is divided by two.

Figure 15:
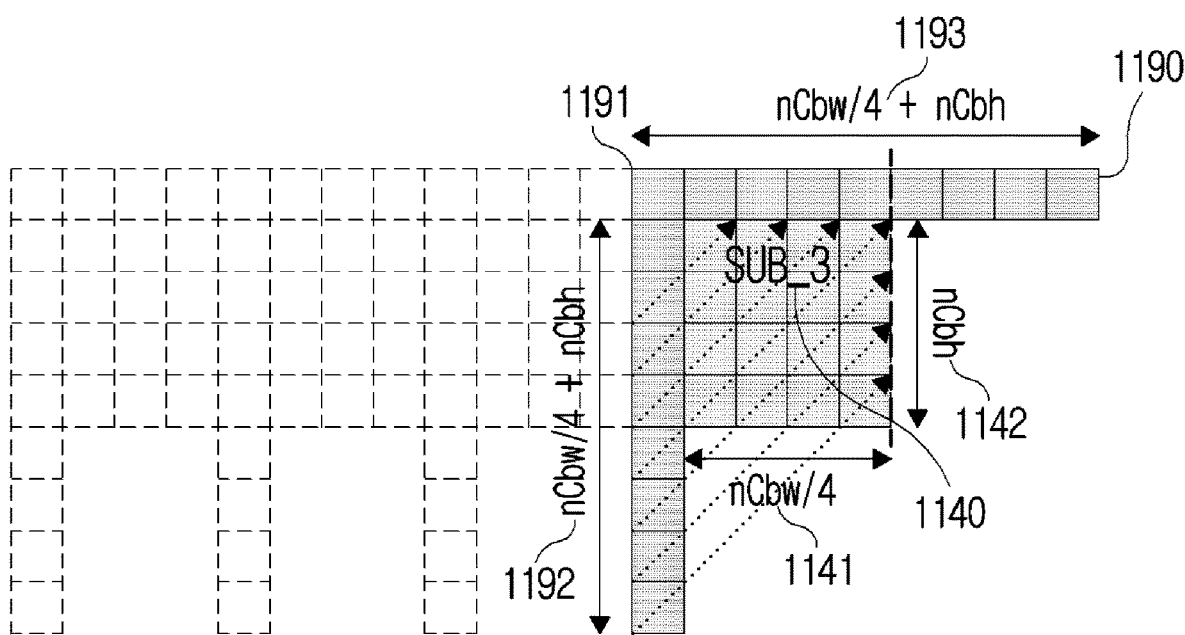

According to one embodiment, a method of dividing a current coding unit into two or more sub-blocks includes a method of four-division based on quadtree partitioning structure when a block width of a current coding unit is equal to a block height, that is, a current coding unit is a square block. When a coding unit is divided by quadtree partitioning to perform sub-block-based intra prediction according to one embodiment of the present invention, the coding unit may not have a multiple-depth quadtree structure but have a single-depth quadtree partition structure. A single-depth quadtree partition structure means that a coding tree is divided into four sub-blocks. FIG. 15 illustrates an example in which a coding unit of an 8×8 square coding block is divided into four sub-blocks by using quadtree block partitioning structure.

Figure 24:
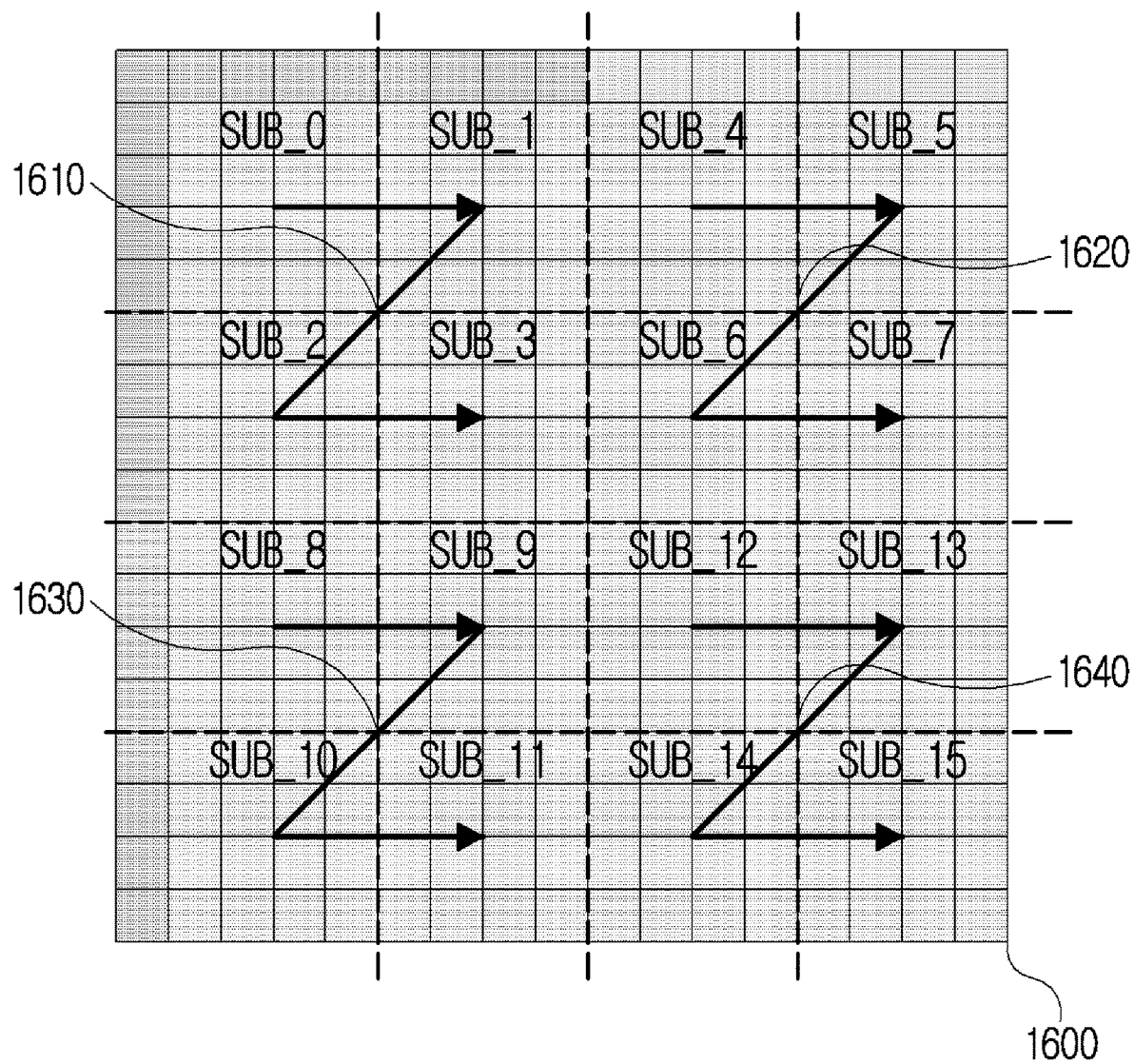
FIG. 24 is a flowchart illustrating the order of sub-block-based intra prediction for a plurality of square sub-blocks generated from one coding block.

According to one embodiment, when a current coding unit is divided into two or more sub-blocks, the coding unit may be divided by using a pre-defined sub-block width and sub-block height. For example, FIG. 24 illustrates an example in which a 16×16 square coding block is divided into 16 sub-blocks. In this case, both the pre-defined width and height of the sub-block are 4, the pre-defined width and height are signaled as a high-level syntax. When encoding and decoding the 16 sub-blocks according to an embodiment of the present invention, the 16 sub-blocks are encoded and decoded according to a Z-order.

Figure 8:
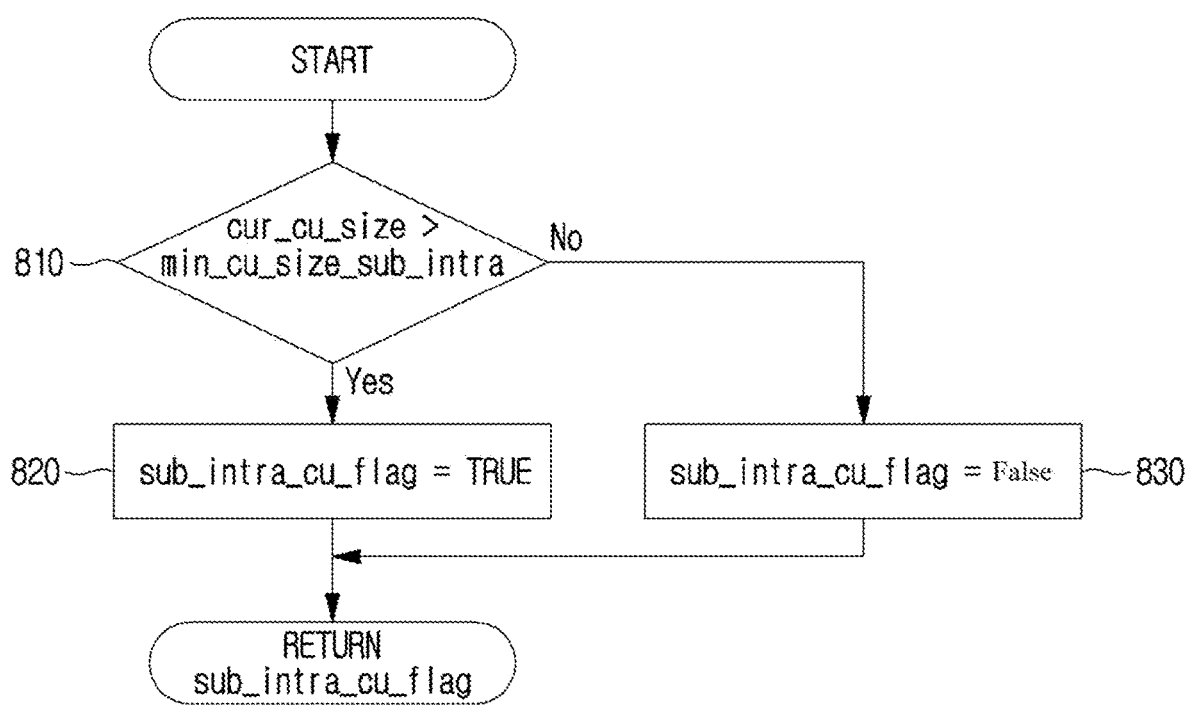
FIG. 8 is a flowchart illustrating sequential steps performed by a sub-block-based intra prediction determination unit according to one embodiment of the present invention.

FIG. 8 is a flowchart illustrating a sub-block-based intra prediction unit according to one embodiment of the present invention.

The sub-block-based intra prediction determination unit 700 according to one embodiment includes: a step 810 of comparing a size of a current coding unit and a size of a minimum coding unit for which sub-block-based intra prediction is allowed; a step 820 of setting a value of a flag indicating execution of sub-block-based intra prediction to "true" when the comparison results in that the size of the current coding unit is larger than the size of the minimum coding unit for which sub-block-based intra prediction is allowed; and a step 830 of setting the value of the flag indicating the execution of sub-block-based intra prediction to "false" when the comparison results in that the size of the current coding unit is equal to or smaller than the size of the minimum coding unit for which the execution of sub-block-based intra prediction is allowed.

According to one embodiment, each of the size of the current coding unit and the size of the minimum coding unit for which sub-block-based intra prediction is allowed means the number of pixels calculated by multiplying a block width by a block height. In case of a 16×16 bock having a block width of 16 and a block height of 16, the size of the block is 256.

According to one embodiment, the size of the minimum coding unit for which sub-block-based intra prediction is allowed is signaled as a high-level syntax or is determined as a pre-defined fixed value. When the size of the minimum coding unit for which sub-block-based intra prediction is allowed is signaled as a high-level syntax, the syntax may be signaled from a sequence parameter set (SPS), a picture parameter set (PPS), or a slice header. On the other hand, when a pre-defined fixed value is used, a pre-defined and fixed minimum block size is used.

Figure 9:
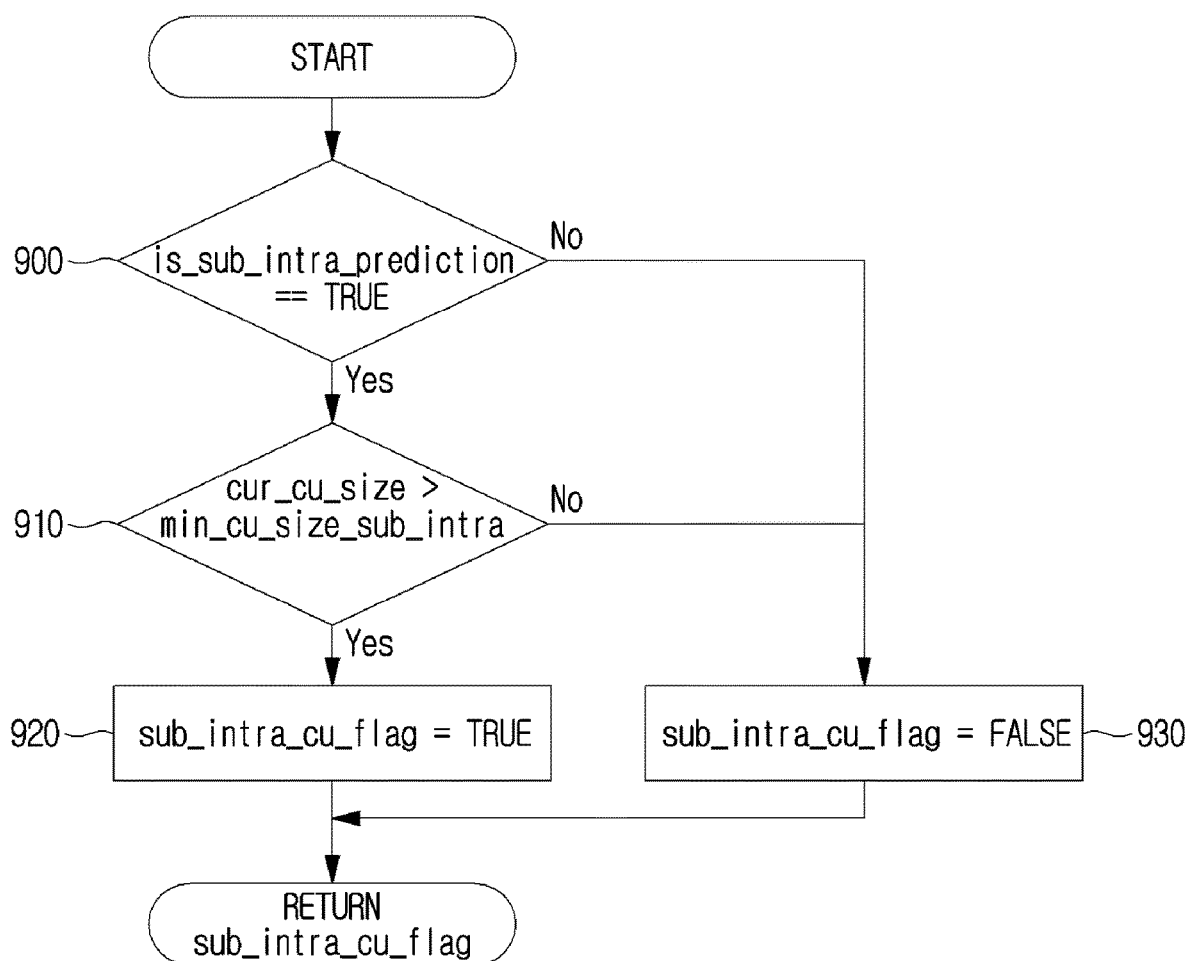
FIG. 9 is a flowchart illustrating sequential steps performed by the sub-block-based intra prediction determination unit according to one embodiment of the present invention.

FIG. 9 is a flowchart illustrating sequential steps performed by a sub-block-based intra prediction determination unit according to one embodiment of the present invention.

According to one embodiment, the sub-block-based intra prediction determination unit 700 includes: a step 900 of determining whether to perform sub-block-based intra prediction during a current encoding or decoding process; a step 910 of comparing a size of a current coding unit and a size of a minimum coding unit for which the sub-block-based intra prediction is allowed; according to a result of the determining and the comparing, a step 920 of setting a value of a flag for sub-block-based intra prediction "true"; and a step 930 of setting the value of the flag for sub-block-based intra prediction to "false".

According to one embodiment, the step 900 of determining whether to perform sub-block-based intra prediction during a current encoding or decoding process means a process of determining whether flag information signaled as a high-level syntax indicates true or false.

Figure 10:
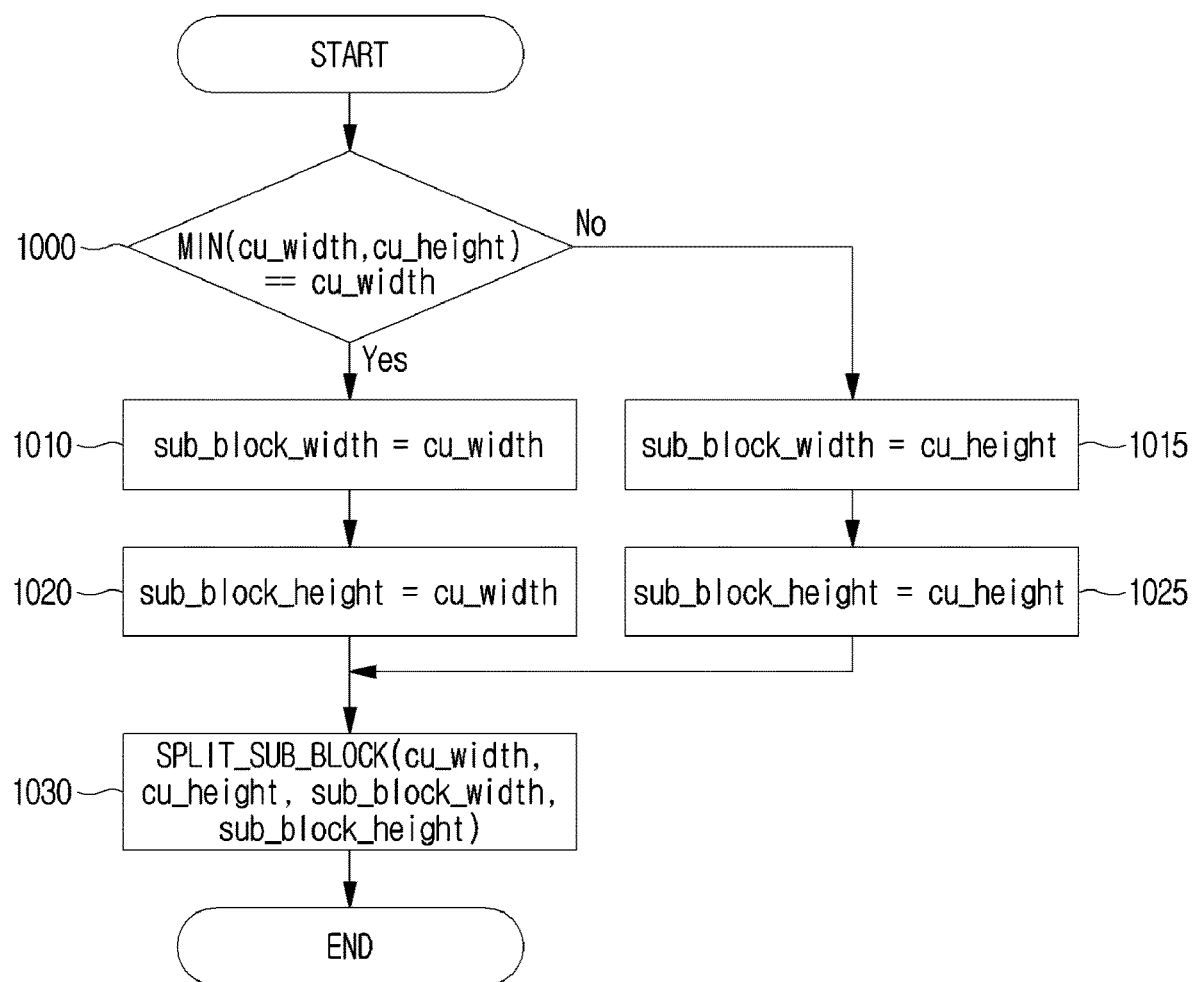
FIG. 10 is a flowchart illustrating sequential steps performed by a sub-block-based block partition unit that generates a square block with each side that has the same size as a smaller one of a block width and a block height of a current coding unit.

FIG. 10 is a flowchart illustrating sequential steps performed by the sub-block-based block partition unit that generates a square block with each side having the same size as a smaller one of a block width and a block height of a current coding unit according to one embodiment of the present invention.

According to one embodiment, the sub-block-based block partition unit 741 includes: a step 1000 of determining a smaller size among a width and a height of a current coding block; steps 1010, S1015, S1020, 1025 of setting a width and a height of a sub-block to the smaller size according to the smaller size among the width and the height of the current coding block; and a step 1030 of dividing the current coding block into multiple sub-blocks based on the width and height of the current coding block and the width and height of the sub-block.

In the method of dividing a current coding unit into two or more sub-blocks according to one embodiment of the present invention, in order to divide into square sub-blocks with each side that has the same size as a smaller one among a width and a height of the current coding unit, the width and the height of the sub-blocks are set through the step 1010, 1015 of setting the width of the sub-blocks and the step S1020, 1025 of setting the height of the sub-blocks. Next, the width and height of the current coding unit and the width and height of the sub-blocks, which are set to the smaller one among the width and the height of the current coding unit, are received as input data, and the current coding unit is divided (step 1030) according to the input data. As a result, multiple sub-blocks are generated.

FIGS. 11 to 15 are diagrams illustrating square sub-blocks generated from a coding block, each square sub-block having each side that has the same size as a smaller one of a block width and a block height of the coding block, according to one embodiment of the present invention.

In one embodiment of the present invention, a case where a coding block 1100 having a 16×4 size is divided into square sub-blocks 1110, 1120, 1130, and 1140 with each side having the same size as a smaller one among a block width and a block height of the coding block 1100 will be described.

FIG. 11 is a diagram illustrating one coding block 1100 and a reference sample buffer 1150 constructed by using reference samples that are spatially adjacent to the coding block 1100 and are used for intra prediction of the coding block 1100. When block-based intra prediction is performed on one coding block according to a conventional technique, that is, when intra prediction is performed on the coding block 1100 without dividing the current coding block 1100 into multiple sub-blocks, the reference sample buffer 1150 needs to have a size of 2nCbw+2nCBh+1 composed of nCbw+nCBh left samples 1152, nCbw+nCBh upper samples 1153 and the upper-left sample 1151, based on a block width 1101 of nCbw and a block height 1102 of nCbh.

Referring to FIG. 11, when the coding block 1100 is divided into the square sub-blocks 1110, 1120, 1130, and 1140 with each side having the same size as a smaller one among the block width and the block height of the coding block 1100, the sub-blocks sequentially undergo intra prediction. In this case, intra prediction on the sub-block is sequentially performed from the upper-left sub-block to the bottom-right sub-block. In the case of the example of FIG. 11, intra prediction is performed four times for the current coding unit. Specifically, intra prediction is first performed on a first 4×4 sub-block 1100, next on a second 4×4 sub-block block 1120, subsequently on a third 4×4 sub-block 1130, and finally on a fourth 4×4 sub-block 140.

Figure 12:
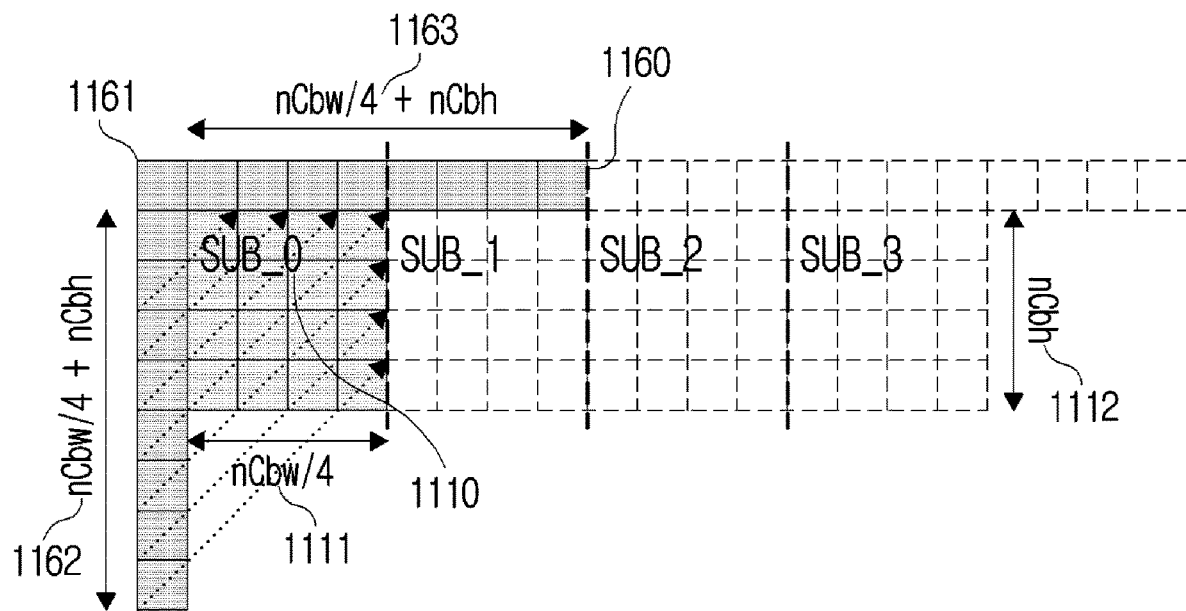

Referring to FIG. 12, according to one embodiment of the present invention, when performing intra prediction on the first sub-block 1110 among the sub-blocks, a reference sample buffer 1160 is constructed to have a size of $2nCbw_0 + 2nCbh_0 + 1$ based on the block width 1111 '$nCbw_0$' and the block height 1112 '$nCbh_0$' of the first sub-block 1110, unlike the size of the reference sample buffer 1150 used in the intra prediction process in which one coding block is not divided into multiple sub-blocks. In the embodiment illustrated in FIG. 12, nCbw0 is equal to nCbw/4 and nCbh0 is equal to nCbh.

Figure 13:
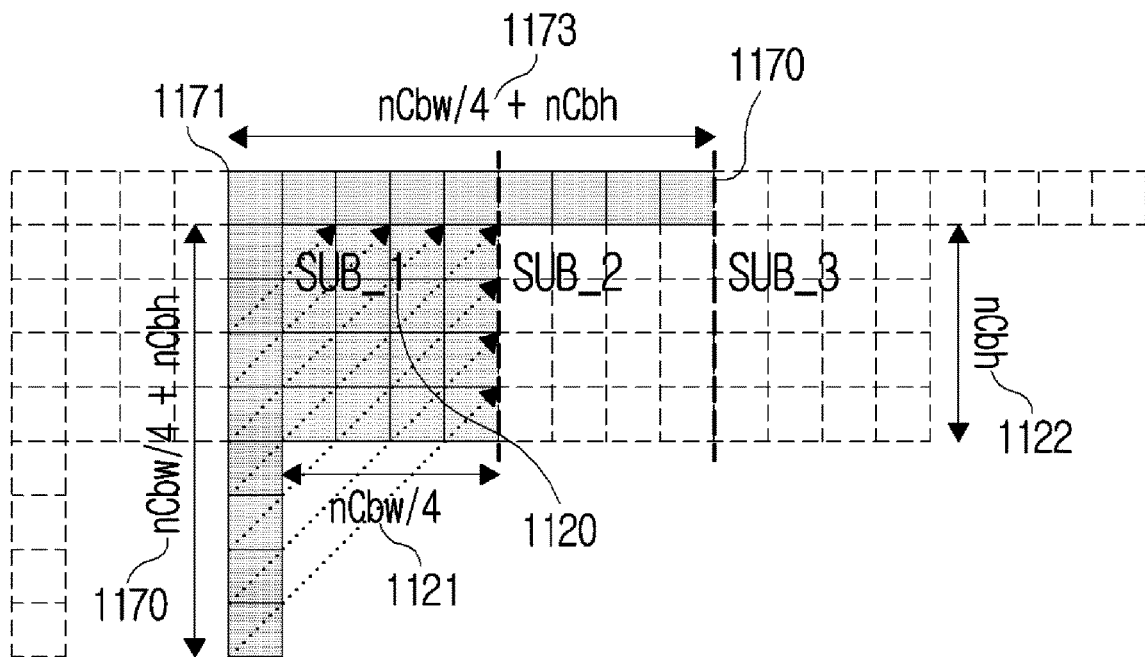

Referring to FIG. 13, according to one embodiment of the present invention, when performing intra prediction on the second sub-block 1120 of the sub-blocks, reconstructed samples generated through the intra prediction and reconstruction of the first sub-block 1110 are used as reference samples. When constructing a reference sample buffer 1170 to perform intra prediction on the second sub-block 1120, nCbw/2+2nCbh+1 samples including reconstructed samples generated through the intra prediction and reconstruction of the first sub-block 1110 may be used. nCbw/2+2nCbh+1 samples consist of nCbw/4+nCbh left samples 1172, nCbw/4+nCbh upper samples 1173 and the upper-left sample 1171.

Figure 14:
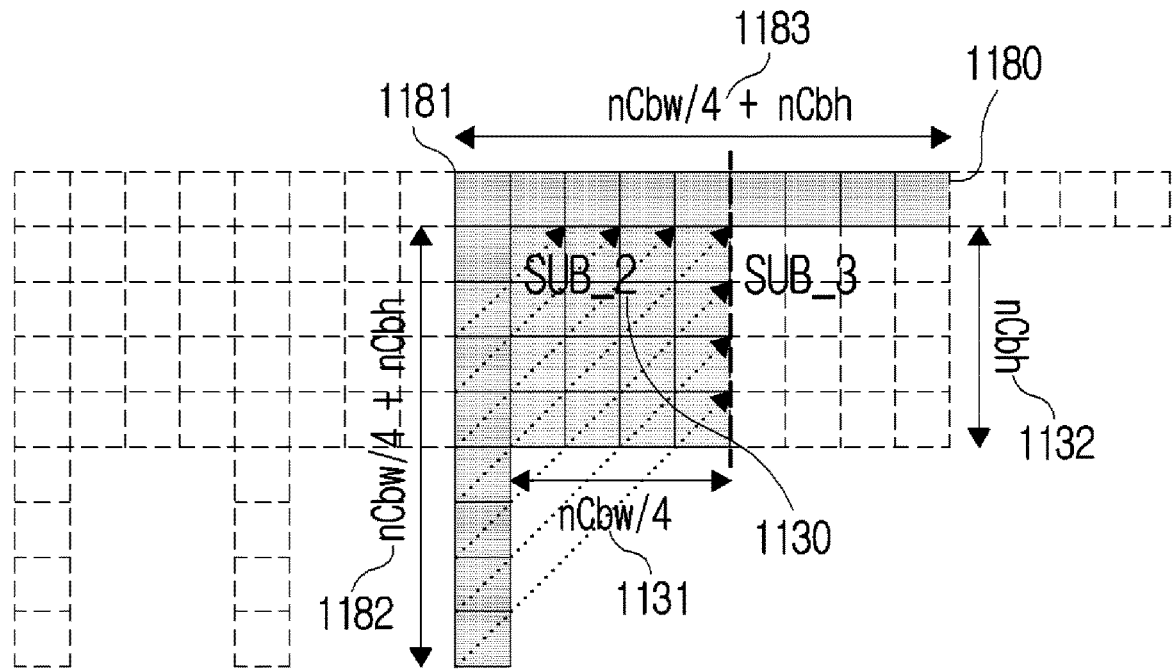

Referring to FIG. 14, according to one embodiment of the present invention, when performing intra prediction on the third sub-block 1130 of the sub-blocks, reconstructed samples generated through the intra prediction and reconstruction of the second sub-block 1120 are used as reference samples. When constructing a reference sample buffer 1180 to perform intra prediction on the third sub-block 1130, nCbw/2+2nCbh+1 samples including reconstructed samples generated through the intra prediction and reconstruction of the second sub-block 1120 may be used. nCbw/2+2nCbh+1 samples consist of nCbw/4+nCbh left samples 1182, nCbw/4+nCbh upper samples 1183 and the upper-left sample 1181.

Referring to FIG. 15, according to one embodiment of the present invention, when performing intra prediction on the fourth sub-block 1140 of the sub-blocks, reconstructed samples generated through the intra prediction and reconstruction of the third sub-block 1130 are used as reference samples. When constructing a reference sample buffer 1190 to perform intra prediction on the fourth sub-block 1140, nCbw/2+2nCbh+1 samples including reconstructed samples generated through the intra prediction and reconstruction of the third sub-block 1130 may be used. nCbw/2+2nCbh+1 samples consist of nCbw/4+nCbh left samples 1192, nCbw/4+nCbh upper samples 1193 and the upper-left sample 1191.

Figure 16:
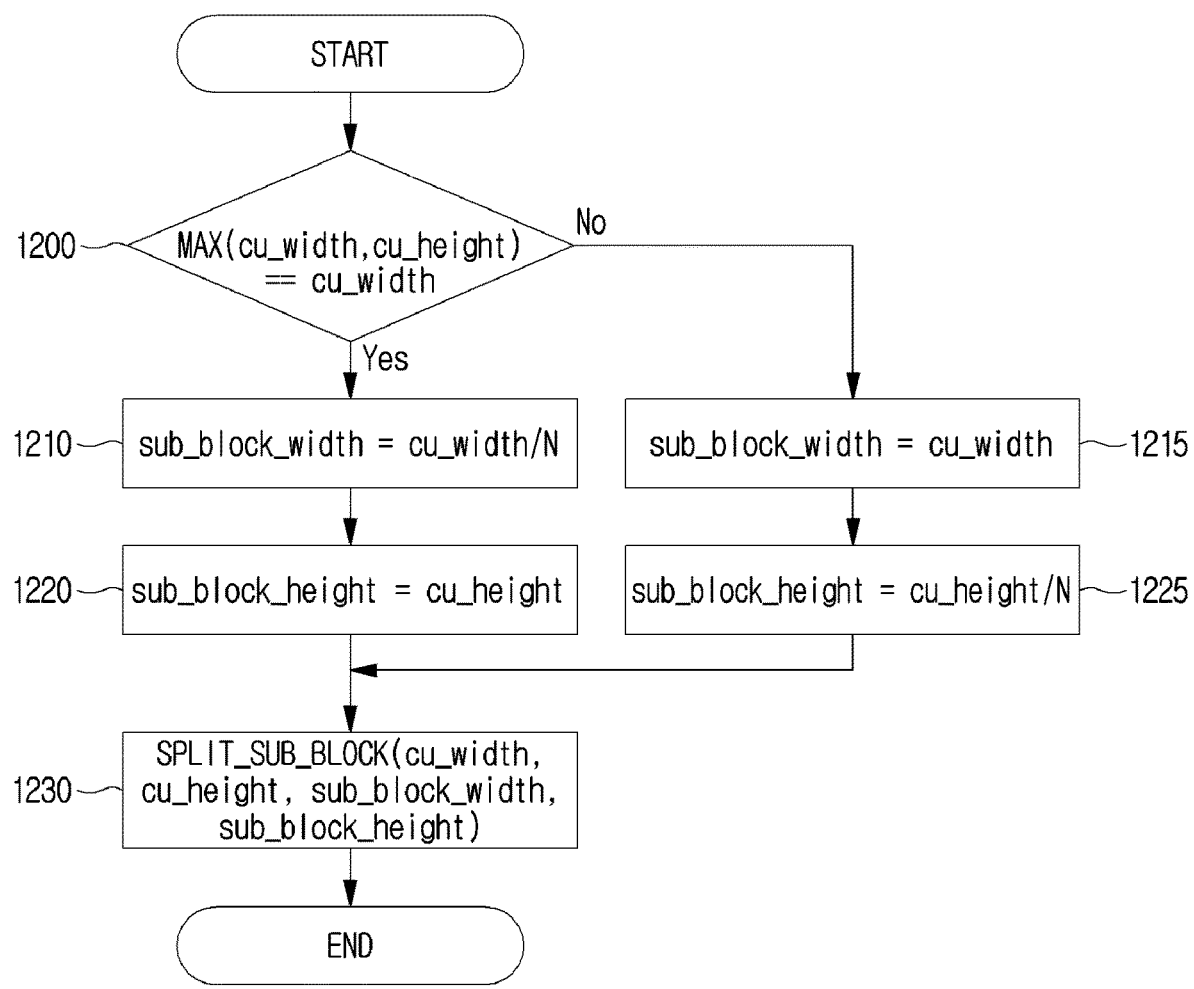
FIG. 16 is a flowchart illustrating sequential steps performed by a sub-block-based block partition unit that divides a current coding unit into N square or rectangular blocks, in which the division is performed such that a larger one among the block width and the block height of the current coding unit is divided by N.

FIG. 16 is a flowchart illustrating sequential steps performed by the sub-block-based block partition unit that divides a current coding unit into N square or non-square blocks, in which the division is performed such that a larger one of the block width and the block height of the current coding unit is divided by N.

According to one embodiment, the sub-block-based block partition unit 741 includes: a step 1200 of determining a larger one among a width and a height of a current coding block; steps 1210, 1215, 1220, 1225 of setting a width and a height of a sub-block to a value obtained by dividing the larger one among the width and the height of the current coding block by N; and a step 1230 of dividing the current coding block into a plurality of sub-blocks by receiving the width and the height of the current coding block and the width and the height of each of the sub-blocks.

In the method of dividing a current coding block into two or more sub-blocks according to one embodiment of the present invention, in order to generate sub-blocks each of which has a width or a height that is the same as a value obtained by dividing a larger one among the width and the height of the current coding block by N, the step 1210, 1215 of setting the width of the sub-block and the step 1220, 12125 of setting the height of the sub block are performed to set the width and the height of the sub-block. Next, a current coding unit may be divided into a plurality of sub-blocks by the step 1230 of receiving the width and height of the current coding unit and the width and height of the sub-block as input data.

FIG. 17 is a diagram illustrating an example in which a coding block is divided into N square or non-square blocks by dividing a larger one among a block width and a block height of the coding block by N, according to one embodiment of the present invention.

In one embodiment of the present invention, as illustrated in FIG. 17, a case where a coding block 1300 having a 4×16 size is divided into two non-square sub-blocks 1310 and 1320 is described. The sub-blocks are generated by dividing a larger one among a width and a height of the coding block 1200 by 2.

FIG. 17 is a diagram illustrating one coding block 1300 and a reference sample buffer 1330 constructed by using reference samples that are spatially adjacent to the coding block 1300 and are used for intra prediction of the coding block 1300. When block-based intra prediction is performed on one coding block according to a conventional technique, that is, when intra prediction is performed on the coding block 1300 without dividing the current coding block 1300 into multiple sub-blocks, the reference sample buffer 1330 needs to have a size of 2nCbw+2nCBh+1 composed of nCbw+nCBh left samples 1332, nCbw+nCBh upper samples 1133 and the upper-left sample 1331, based on a block width 1301 of nCbw and a block height 1302 of nCbh.

According to one embodiment of the present invention, when dividing one coding block 1300 into N square or non-square sub-blocks 1310 and 1320 in a way of dividing a larger one among a width and a height of the block by N, intra prediction is sequentially performed on the generated N sub-blocks. In this case, intra prediction for the N sub-blocks is sequentially performed from the upper-left sub-block to the bottom-right sub-block. In the embodiment of FIG. 17, an upper 4×8 block 1310 is intra-predicted, and then a lower 4×8 block 1320 is intra-predicted. That is, intra prediction is performed two times.

According to one embodiment of the present invention, when performing intra prediction on the first sub-block 1310 among the sub-blocks, a reference sample buffer 1340 is constructed to have a size of $2nCbw_0 + 2nCbh_0 + 1$ based on the block width 1311 '$nCbw_0$' and the block height 1312 '$nCbh_0$' of the first sub-block 1310, unlike the size of the reference sample buffer 1330 used in the intra prediction process in which one coding block is not divided into multiple sub-blocks. In the embodiment illustrated in FIG. 17, $nCbw_0$ is equal to nCbw and $nCbh_0$ is equal to nCbh/2.

According to one embodiment of the present invention, when performing intra prediction on the second sub-block 1320 of the sub-blocks, reconstructed samples generated through the intra prediction and reconstruction of the first sub-block 1310 are used as reference samples. When constructing a reference sample buffer 1350 to perform intra prediction on the second sub-block 1320, 2nCbw+nCbh+1 samples including reconstructed samples generated through the intra prediction and reconstruction of the first sub-block 1310 may be used. 2nCbw+nCbh+1 samples consist of nCbw+nCbh/2 left samples 1352, nCbw+nCbh/2 upper samples 1353 and the upper-left sample 1351.

Figure 18:
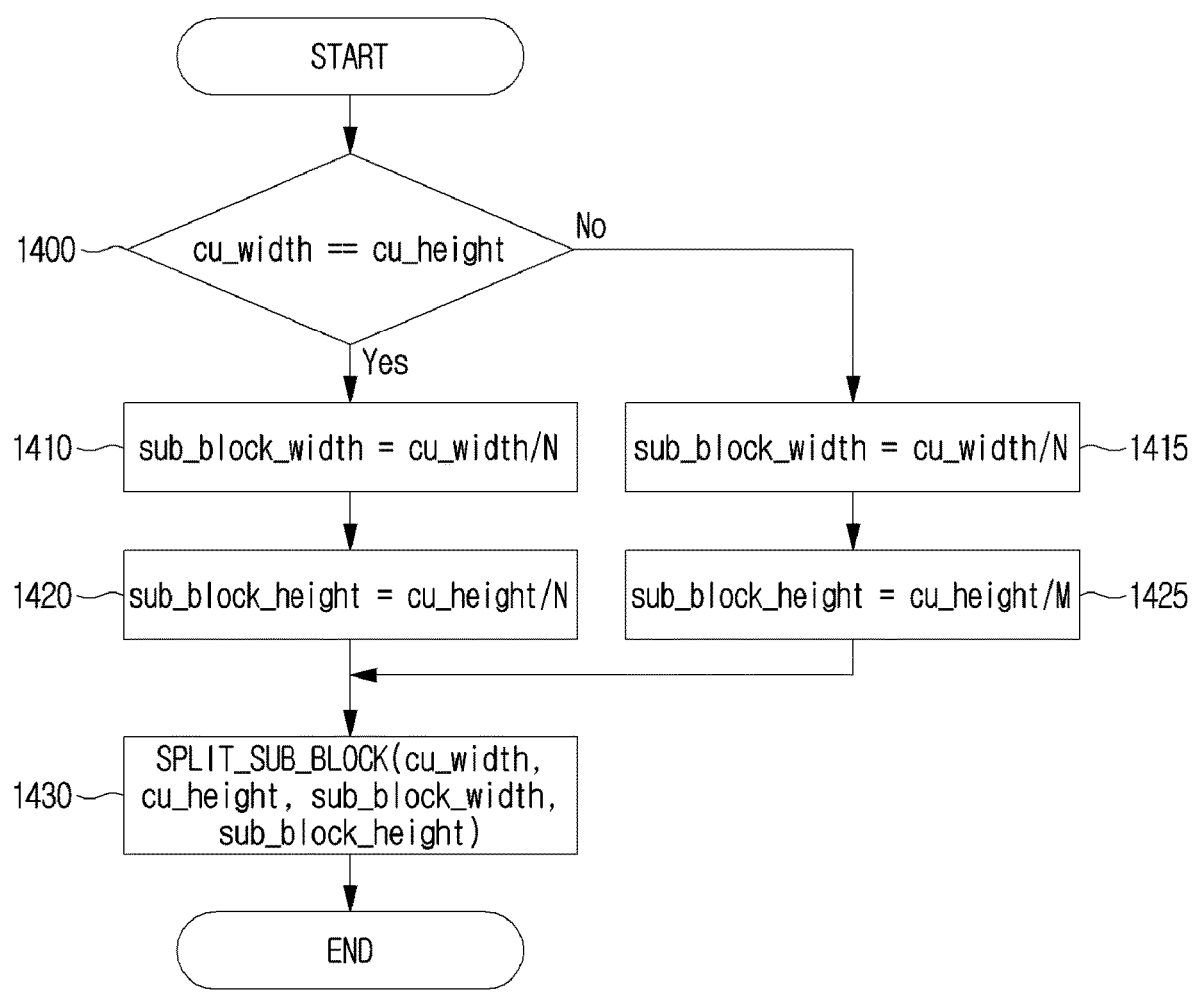
FIG. 18 is a flowchart illustrating sequential steps performed by a sub-block-based block partition unit that divides a coding block into a plurality of square sub-blocks.

FIG. 18 is a flowchart illustrating sequential steps performed by the sub-block-based block partition unit that divides a coding block into a plurality of square sub-blocks according to one embodiment of the present invention.

According to one embodiment, the sub-block-based block partition unit 741 includes: a step 1400 of determining whether a current coding block is a square block on the basis of a width and a height of the current coding block; a step 1410, 1420 of setting a width and a height of a sub-block to a value obtained by dividing the width and the height of the current coding block by N when it is determined that the current coding block is a square block; a step 1415, 1425 of setting a width and a height of a sub-block to values, respectively, obtained by dividing the width and the height of the current coding block by N and M, respectively when it is determined that the current coding block is a non-square block; and a step 1430 of dividing the current coding block into multiple sub-blocks by receiving the width and height of the current coding block and the width and height of the sub-block as input data.

In the method of dividing a current coding block into two or more sub-blocks according to one embodiment of the present invention, in order to generate multiple square sub-blocks on the basis of a result of determination of whether the current coding block is a square block, which is determined on the basis of the width and the height of the current coding block, the width and the height of the sub-blocks are set through the step 1410, 1415 of setting the width of the sub-blocks and the step 1420, 1425 of setting the height of the sub-blocks. Next, a current coding unit may be divided into a plurality of sub-blocks by the step 1430 of receiving the width and height of the current coding unit and the width and height of the sub-block as input data.

FIGS. 19 to 23 are diagrams illustrating examples in which a coding block is divided into a plurality of square sub-blocks, according to one embodiment of the present invention.

Figure 19:
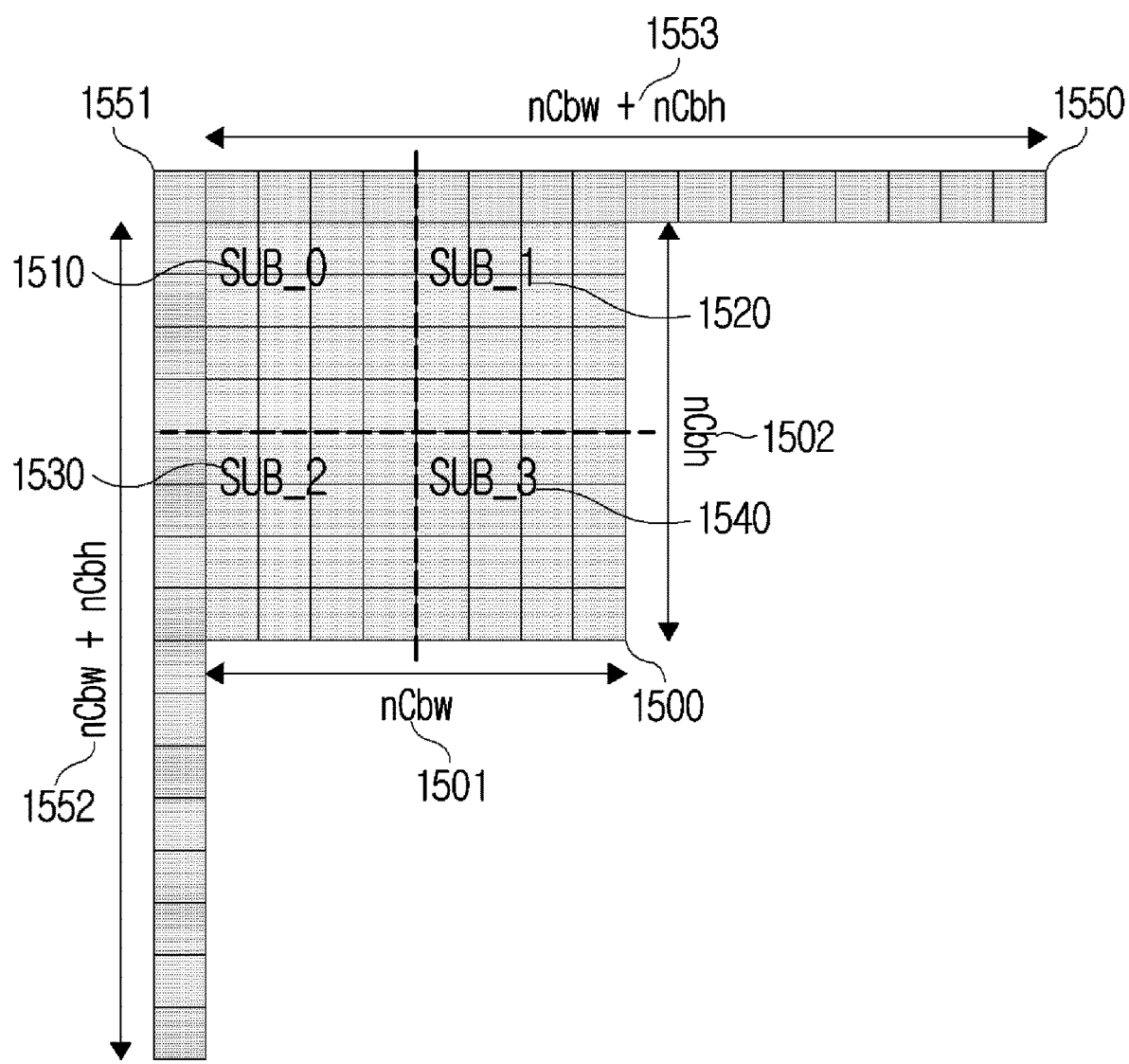
FIGS. 19 to 23 are diagrams illustrating examples in which a coding block is divided into a plurality of square sub-blocks, according to one embodiment of the present invention; and 34.

In one embodiment of the present invention, as illustrated in FIG. 19, a case where a coding block 1500 having an 8×8 size is divided into four square sub-blocks is described.

FIG. 19 is a diagram illustrating one coding block 1500 and a reference sample 1550 constructed by using reference samples that are spatially adjacent to the coding block 1500 and are used for intra prediction of the coding block 1500. When block-based intra prediction is performed on one coding block according to a conventional technique, that is, when intra prediction is performed on the coding block 1500 without dividing the current coding block 1500 into multiple sub-blocks, the reference sample buffer 1550 needs to have a size of 2nCbw+2nCBh+1 composed of nCbw+nCBh left samples 1552, nCbw+nCBh upper samples 1553 and the upper-left sample 1551, based on a block width 1501 of nCbw and a block height 1502 of nCbh.

Referring to FIG. 19, according to one embodiment of the present invention, when one coding block 1500 is divided into multiple square sub-blocks 1510, 1520, 1530, and 1540, intra prediction is sequentially performed on each of the sub-blocks 1510, 1520, 1530, and 1540, one after another. In this case, the intra prediction for the sub-blocks is performed in a Z-order. That is, the intra prediction is performed in this order of an upper-left sub-block, an upper-right sub-block, a bottom-left sub-block, and a bottom-right sub-block. In the case of the example of FIG. 15, four times of intra prediction are performed for the current coding block. Specifically, intra prediction is first performed on a first 4×4 sub-block 1510, next on a second 4×4 sub-block 1520, subsequently on a third 4×4 sub-block 1530, and finally on a fourth 4×4 sub-block 1540.

Figure 20:
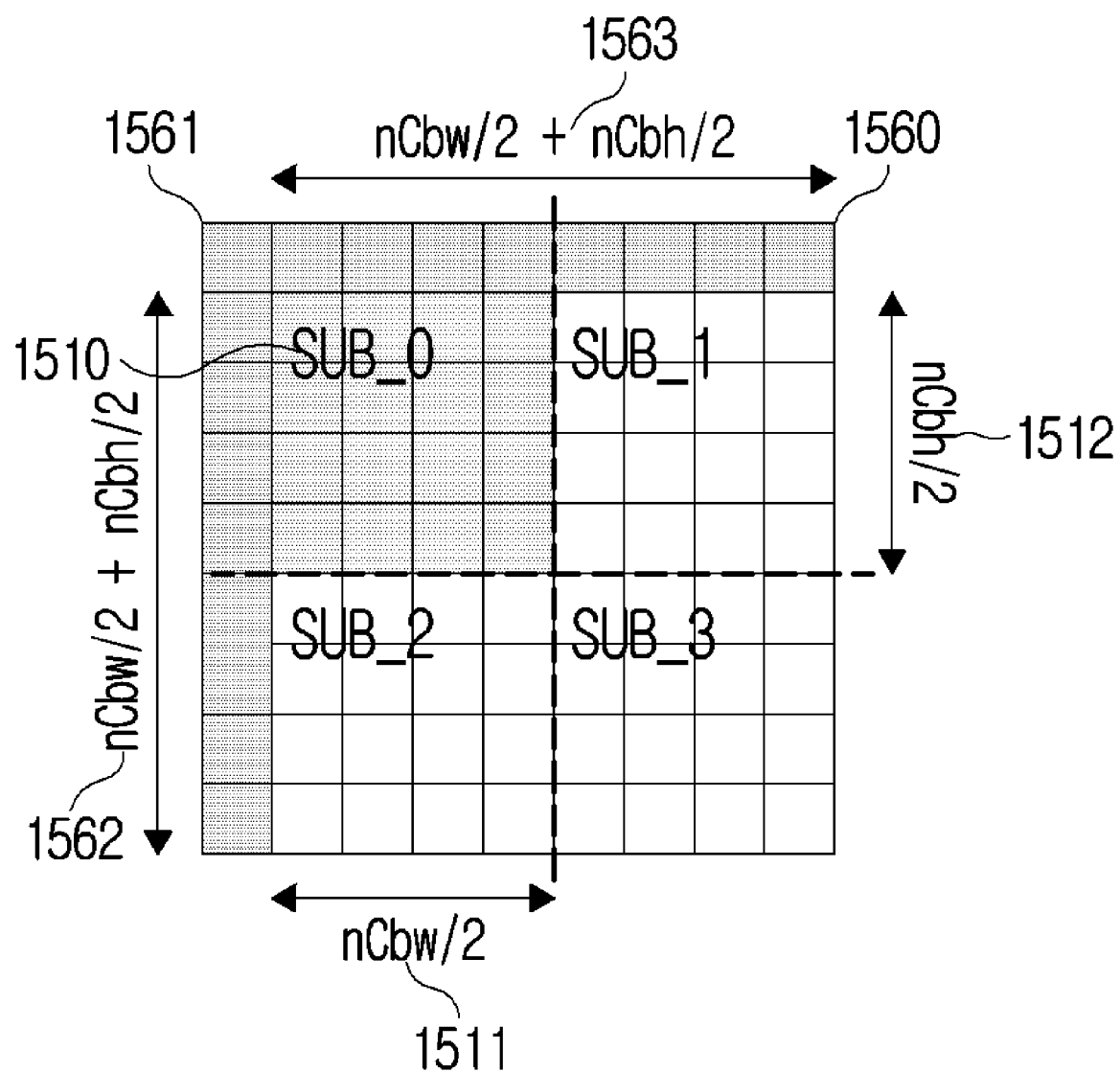

Referring to FIG. 20, according to one embodiment of the present invention, when performing intra prediction on the first sub-block 1510 among the sub-blocks, a reference sample buffer 1560 is constructed to have a size of $2nCbw_0 + 2nCbh_0 + 1$ based on the block width 1511 '$nCbw_0$' and the block height 1512 '$nCbh_0$' of the first sub-block 1510, unlike the size of the reference sample buffer 1550 used in the intra prediction process in which one coding block is not divided into multiple sub-blocks In the embodiment illustrated in FIG. 15, $nCbw_0$ is equal to nCbw/2 and $nCbh_0$ is equal to nCbh/2.

Figure 21:
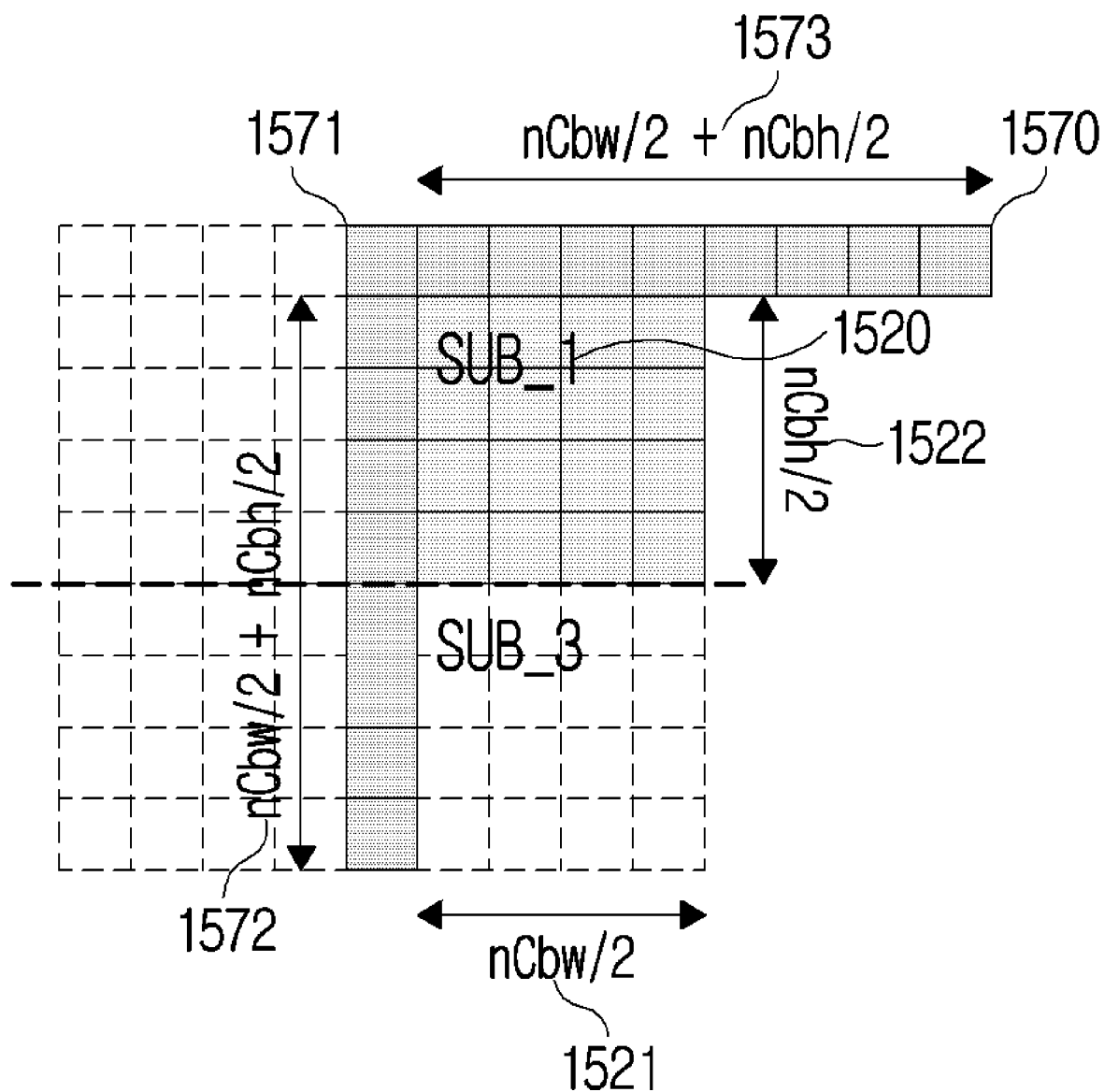

Referring to FIG. 21, according to one embodiment of the present invention, when performing intra prediction on the second sub-block 1520 of the sub-blocks, reconstructed samples generated through the intra prediction and reconstruction of the first sub-block 1510 are used as reference samples. When constructing a reference sample buffer 1570 to perform intra prediction on the second sub-block 1520, nCbw+nCbh+1 samples including reconstructed samples generated through the intra prediction and reconstruction of the first sub-block 1510 may be used. nCbw+nCbh+1 samples consist of nCbw/2+nCbh/2 left samples 1572, nCbw/2+nCbh/2 upper samples 1573 and the upper-left sample 1571.

Figure 22:
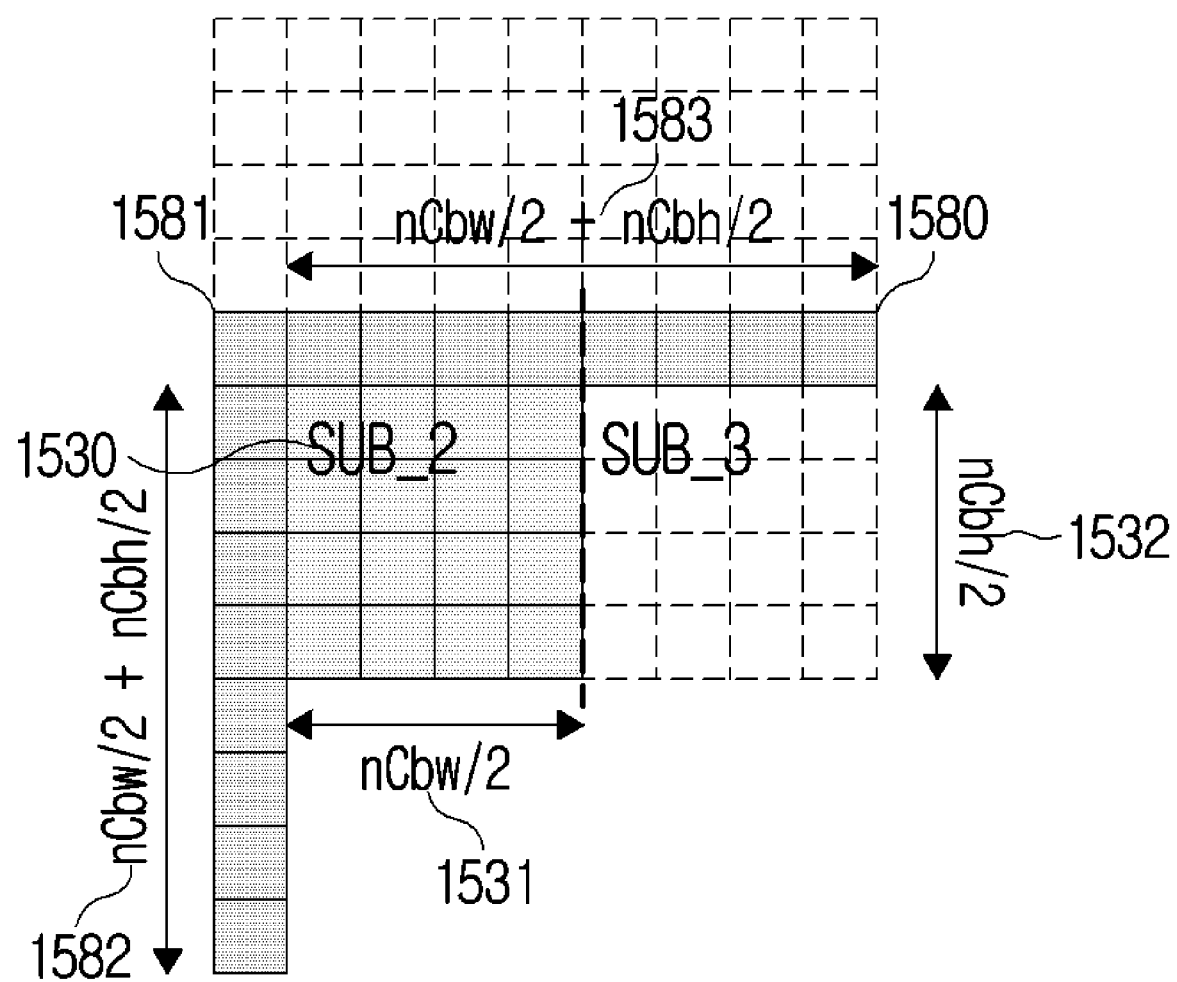

Referring to FIG. 22, according to one embodiment of the present invention, when performing intra prediction on the third sub-block 1530 of the sub-blocks, reconstructed samples generated through the intra prediction and reconstruction of the second sub-block 1520 are used as reference samples. When constructing a reference sample buffer 1580 to perform intra prediction on the third sub-block 1530, nCbw+nCbh+1 samples including reconstructed samples generated through the intra prediction and reconstruction of the second sub-block 1520 may be used. nCbw+nCbh+1 samples consist of nCbw/2+nCbh/2 left samples 1582, nCbw/2+nCbh/2 upper samples 1583 and the upper-left sample 1581.

Figure 23:
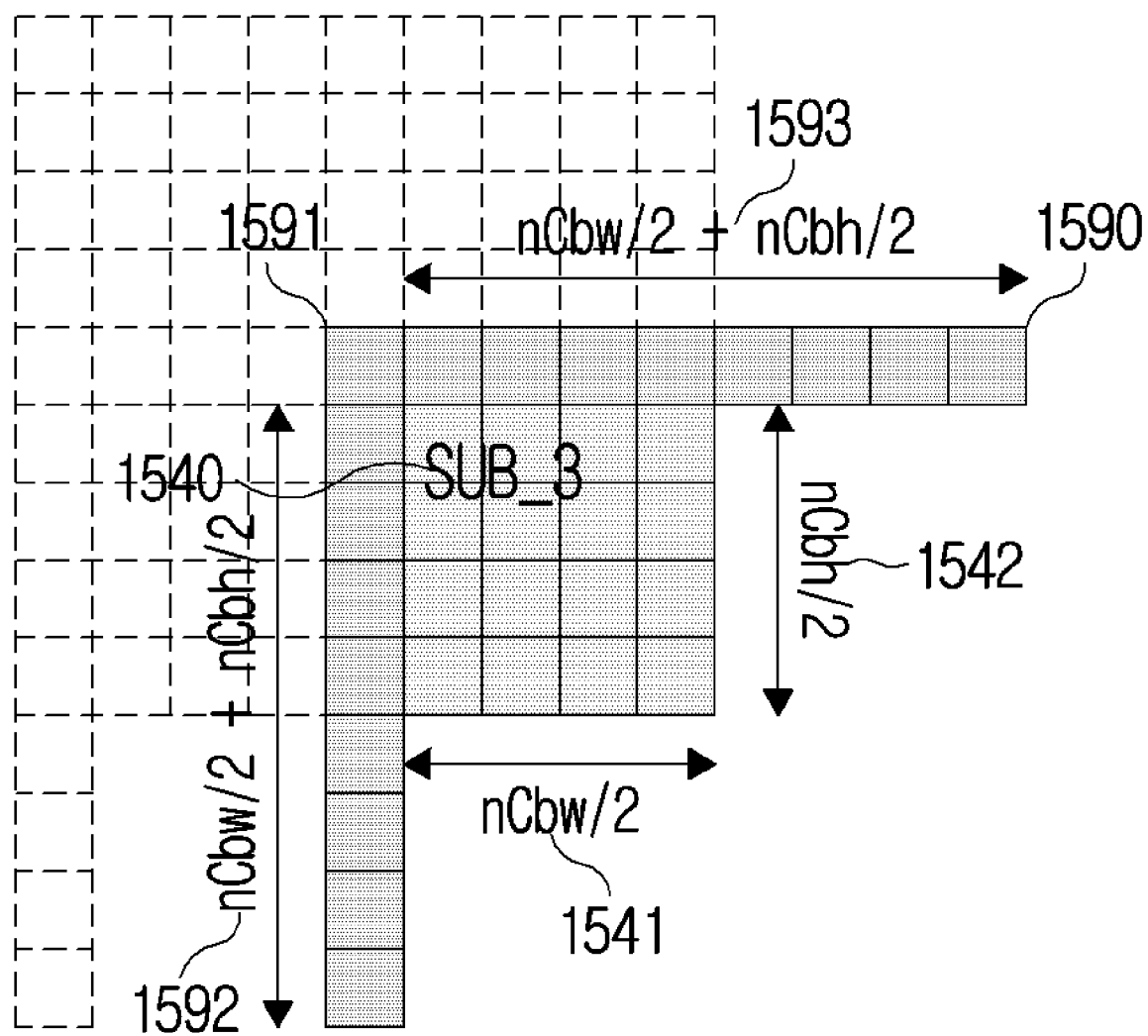

Referring to FIG. 23, according to one embodiment of the present invention, when performing intra prediction on the fourth sub-block 1540 of the sub-blocks, reconstructed samples generated through the intra prediction and reconstruction of the third sub-block 1530 are used as reference samples. When constructing a reference sample buffer 1590 to perform intra prediction on the fourth sub-block 1540, nCbw+nCbh+1 samples including reconstructed samples generated through the intra prediction and reconstruction of the third sub-block 1530 may be used. nCbw+nCbh+1 samples consist of nCbw/2+nCbh/2 left samples 1592, nCbw/2+nCbh/2 upper samples 1593 and the upper-left sample 1591.

According to one embodiment of the present invention, a video coding method of processing by dividing a square or non-square coding block into a plurality of square sub-blocks includes: dividing a square or non-square intra prediction block into square sub-blocks, the number of sub-blocks being N×M, adding prediction sub-blocks obtained by performing prediction on each of the N×M square sub-blocks to reconstructed residual sub-blocks obtained by performing inverse quantization and inverse transform on each of residual sub-blocks, respectively, and generating reconstructed sub-blocks obtained by a block reconstruction process. The above-described series of processes are performed independently in units of sub-blocks.

According to one embodiment of the present invention, the video coding method of processing by dividing a square or non-square coding block into a plurality of square sub-blocks may be applied to an intra prediction block as well as an inter prediction block. The series of processes of dividing a square or non-square inter prediction block into square sub-blocks, the number of sub-blocks being N×M, adding prediction sub-blocks obtained by performing prediction on each of the square sub-blocks to reconstructed residual sub-blocks obtained by performing inverse quantization and inverse transform on each of residual sub-blocks, respectively and generating reconstructed sub-blocks obtained by a block reconstruction process are performed independently in units of subblocks.

FIG. 24 is a flowchart illustrating the order of sub-block-based intra prediction for a plurality of square sub-blocks generated from one coding block.

In one embodiment of the present invention, as illustrated in FIG. 24, a case where a coding block 1600 having a 16×16 size is divided into 16 square sub-blocks is described. The order of the sub-blocks to undergo sub-block-based intra prediction will be described in detail.

According to one embodiment of the present invention, to perform sub-block-based intra prediction, a 16×16 coding block 1600 is divided into multiple sub-blocks. For example, 16 sub-blocks each having a 4×4 size are generated as illustrated in FIG. 24. The 16 sub-blocks each having a 4×4 size are sequentially predicted in a Z-order. First, each of sub-blocks SUB_0 to SUB_3 is first sequentially intra-predicted in a Z-order, and each of sub-blocks SUB_4 to SUB_7 is then sequentially intra-predicted in a Z-order. Similarly to the way described above, each of sub-blocks SUB8 to SUB_11 is first sequentially intra-predicted, and each of sub-blocks SUB_12 to SUB_15 is then sequentially intra-predicted in a Z-order.

In the sub-block-based intra prediction proposed by the present invention, like the above-described embodiment in which a coding block is divided into multiple sub-blocks that are arranged in rows and columns, each of the sub-blocks is sequentially intra-predicted, one after another, in a Z-order.

INDUSTRIAL APPLICABILITY

The present invention relates to an image processing technology and can be used for coding of video signals.

The invention claimed is:

1. An image decoding method performed by an image decoding apparatus, the method comprising:
    determining whether to perform sub-block-based intra prediction on a current coding unit;
    generating a prediction signal of the current coding unit according to the determination;
    generating a residual signal of the current coding unit by performing an inverse-quantization and an inverse-transform on quantized coefficients of the current coding unit, the quantized coefficients being decoded from a bitstream; and
    reconstructing the current coding unit based on the prediction signal and the residual signal,
    wherein, in response to the determination that the sub-block-based intra prediction is not performed on the current coding unit, the prediction signal of the current coding unit is generated by performing block-based intra prediction on the current coding unit,
    wherein, in response to the determination that the sub-block-based intra prediction is performed on the current coding unit, the prediction signal of the current coding unit is generated by performing intra prediction on each of sub-blocks resulting from dividing the current coding unit in one of a vertical direction or a horizontal direction,
    wherein, in response to a size of the current coding unit being 8×4, the current coding unit is divided into two sub-blocks, and
    wherein, in response to the size of the current coding unit being 16×4, the current coding unit is divided into four sub-blocks.

2. The method according to claim 1, wherein determining whether to perform the sub-block-based intra prediction on the current coding unit comprises:

determining whether the sub-block-based intra prediction is allowed in a current sequence including the current coding unit;

comparing the size of the current coding unit and a size of a maximum unit that allows the sub-block-based intra prediction when the sub-block-based intra prediction is allowed in the current sequence; and comparing a value obtained by multiplying a width and a height of the current coding unit and a value obtained by multiplying a width and a height of a minimum unit that allows the sub-block-based intra prediction when the sub-block-based intra prediction is allowed in the current sequence.

3. The method according to claim 2, wherein a value of a flag indicating whether to perform the sub-block-based intra prediction on the current coding unit is set to false when a predefined condition is not satisfied, and wherein whether the predefined condition is satisfied is determined based on a result of comparing the size of the current coding unit and the size of the maximum unit and a result of comparing the value obtained by multiplying the width and the height of the current coding unit and the value obtained by multiplying the width and the height of the minimum unit.

4. The method according to claim 3, wherein information on whether the sub-block-based intra prediction is allowed in the current sequence and information on the size of the maximum unit are included in a sequence parameter set, and wherein a size of the minimum unit is a predefined fixed size.

5. The method according to claim 4, wherein the intra prediction on the each of sub-blocks is sequentially performed according to a predetermined order.

6. The method according to claim 1, wherein reference samples for the block-based intra prediction are defined using the width and the height of the current coding unit, and wherein reference samples for the sub-block-based intra prediction are defined using the width and the height of the current coding unit and a width and a height of a sub-block included in the current coding unit.

7. The method according to claim 1, wherein the current coding unit is obtained by dividing a block according to a multi-type tree partitioning, the multi-type tree partitioning including a binary-tree partitioning and a triple-tree partitioning.

8. The method according to claim 7, wherein the triple-tree partitioning is a block partitioning structure of dividing one coding unit into three coding units based on two split lines.

9. The method according to claim 8, wherein the two split lines do not cross a center of the one coding unit, wherein one of the three coding units has a size greater than a size of the other two of the three coding units, wherein the other two of the three coding units have the same size, and wherein the one of the three coding units is located between the other two of the three coding units.

10. An image encoding method performed by an image encoding apparatus, the method comprising:

determining whether to perform sub-block-based intra prediction or block-based intra prediction on a current coding unit;

obtaining a residual signal of the current coding unit, the residual signal being a difference between a prediction signal obtained according to the determination and an original signal of the current coding unit; and generating a bitstream by performing a transform and a quantization on the residual signal of the current coding unit, wherein, in response to the sub-block-based intra prediction, the prediction signal of the current coding unit is generated by performing intra prediction on each of sub-blocks resulting from dividing the current coding unit in one of a vertical direction or a horizontal direction, wherein, in response to a size of the current coding unit being 8×4, the current coding unit is divided into two sub-blocks, and wherein, in response to the size of the current coding unit being 16×4, the current coding unit is divided into four sub-blocks.

11. A device for storing a bitstream associated with a video signal, wherein the bitstream includes information generated by encoding a residual signal of a current coding unit, wherein the residual signal of the current coding unit is a difference between a prediction signal of the current coding unit and an original signal of the current coding unit, wherein the transformed residual signal is obtained by performing a transform on the residual signal of the current coding unit, wherein the prediction signal of the current coding unit is generated according to one of sub-block-based intra prediction or block-based intra prediction, wherein, in response to the sub-block-based intra prediction, the prediction signal of the current coding unit is generated by performing intra prediction on each of sub-blocks resulting from dividing the current coding unit in one of a vertical direction or a horizontal direction, wherein, in response to a size of the current coding unit being 8×4, the current coding unit is divided into two sub-blocks, and wherein, in response to the size of the current coding unit being 16×4, the current coding unit is divided into four sub-blocks.

* * * * *